United States Patent
Sun

(10) Patent No.: US 10,673,494 B2
(45) Date of Patent: Jun. 2, 2020

(54) GROUPING MANAGEMENT METHOD, APPARATUS AND SYSTEM IN COORDINATED MULTIPLE POINTS

(71) Applicant: ZTE CORPORATION, Shenzhen (CN)

(72) Inventor: Bo Sun, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 16/317,241

(22) PCT Filed: Jul. 14, 2017

(86) PCT No.: PCT/CN2017/092915
§ 371 (c)(1),
(2) Date: Jan. 11, 2019

(87) PCT Pub. No.: WO2018/010689
PCT Pub. Date: Jan. 18, 2018

(65) Prior Publication Data
US 2019/0238190 A1  Aug. 1, 2019

(30) Foreign Application Priority Data
Jul. 14, 2016 (CN) .......................... 2016 1 0556728

(51) Int. Cl.
*H04W 72/04* (2009.01)
*H04B 7/024* (2017.01)
(Continued)

(52) U.S. Cl.
CPC ............ *H04B 7/024* (2013.01); *H04W 40/32* (2013.01); *H04W 72/12* (2013.01); *H04W 84/12* (2013.01)

(58) Field of Classification Search
CPC ...... H04B 7/024; H04W 40/32; H04W 84/12; H04W 71/12
See application file for complete search history.

(56) References Cited

U.S. PATENT DOCUMENTS

2012/0127908 A1* 5/2012 Gao .................... H04W 72/042
370/312
2012/0320782 A1 12/2012 Seo
(Continued)

FOREIGN PATENT DOCUMENTS

CN        101873675 A    10/2010
CN        101965060 A    2/2011
(Continued)

OTHER PUBLICATIONS

International Search Report; International Application No. EP 17827025.2; International Filing Date: Jul. 14, 2017; dated May 20, 2019; 21 pages.

*Primary Examiner* — Dac V Ha
(74) *Attorney, Agent, or Firm* — Li & Cai Intellectual Property (USA) Office

(57) ABSTRACT

The embodiments in the disclosure provide a group management method utilized in coordinated multipoint (CoMP), a device, and a system. The method includes: transmitting, by an access point, identification information of the access point to a station, wherein the identification information is used for identifying a static CoMP cooperating set to which the access point belongs; receiving, by the access point, an acknowledgment request message of a dynamic CoMP cooperating set transmitted by the station, wherein the acknowledgment request message of the dynamic CoMP cooperating set contains information of candidate members belonging to the same dynamic CoMP cooperating set with the access point; and determining, by the access point, whether to form a dynamic CoMP cooperating set with some (Continued)

or all of the candidate members, and feeding back acknowledgment information of the dynamic CoMP cooperating set.

20 Claims, 10 Drawing Sheets

(51) Int. Cl.
  *H04W 40/32* (2009.01)
  *H04W 84/12* (2009.01)
  *H04W 72/12* (2009.01)

(56) References Cited

U.S. PATENT DOCUMENTS

| | | | |
|---|---|---|---|
| 2013/0021925 A1* | 1/2013 | Yin | H04B 7/024 370/252 |
| 2015/0110032 A1* | 4/2015 | Nagata | H04B 7/024 370/329 |
| 2015/0163745 A1 | 6/2015 | Kim | |
| 2015/0256306 A1 | 9/2015 | Kim | |
| 2016/0037511 A1* | 2/2016 | Vincze | H04B 7/024 370/329 |
| 2017/0272219 A1* | 9/2017 | Park | H04W 72/0486 |

FOREIGN PATENT DOCUMENTS

| | | |
|---|---|---|
| CN | 104144475 A | 11/2014 |
| CN | 104956744 A | 9/2015 |
| WO | 2015169031 A1 | 11/2015 |

* cited by examiner

GROUPING MANAGEMENT METHOD, APPARATUS AND SYSTEM IN COORDINATED MULTIPLE POINTS

CROSS-REFERENCE TO RELATED APPLICATION

This application is the 371 application of PCT Application No. PCT/CN2017/092915, filed Jul. 14, 2017, which is based upon and claims priority to Chinese Patent Application No. 201610556728.1, filed Jul. 14, 2016, the entire contents of which are incorporated herein by reference.

TECHNICAL FIELD

The present disclosure relates to the field of communications, and more particularly, to a grouping management method, apparatus and system in Coordinated Multiple Points (CoMP).

BACKGROUND

At present, with the explosive application of Wireless Local Area Network (WLAN), the deployment of the WLAN network is increasingly dense, and the network load is continuously increased. With the increase of networks, the overlapping of network coverage is also more serious, and the efficiency of the WLAN network may decline obviously. This problem cannot be solved by simply increasing the rate. Therefore, IEEE Standard Organization forms related task groups that devote to solving the efficiency problem of the WLAN network, where extensive concern and research have been paid to solve the problems of collision and interference aggravation under dense deployment.

WLAN adopts the technologies defined by IEEE802.11 series standards, including protocols of Medium Access Control (MAC) and Physical Layer (PHY).

A WLAN framework defined by IEEE802.11 includes a Basic Service Set (BSS) consisting of an Access Point (AP) and at least one Station (STA) associated with the AP. FIG. 1 is a schematic diagram illustrating a basic structure of a radio frame according to the related art, and FIG. 2 is a schematic diagram illustrating a basic service set (BSS) of WLAN according to the related art. As shown in FIG. 1, different BSSs may be distinguished through BSS identification information. The BSS identification information includes a Basic Service Set Identifier (BSSID, generally having the same MAC address as the AP) carried in an MAC frame head of the radio frame and a BSS color carried in a physical frame head of the radio frame.

The discovery process of the WLAN is completed through scanning. The scanning includes active scanning and passive scanning. The active scanning refers to that the station transmits a scanning request frame to a set of APs or a specific AP through a competitive mechanism on a certain channel, the AP receiving the scanning request replies a scanning response frame to the transmitting station, and a receiving station obtains system information of the BSS where the AP is located through the scanning response frame. The passive scanning refers to that the AP transmits Beacon frames periodically, and the station acquires the system information of the BSS where the AP is located through monitoring the Beacon frames on a certain channel. The system information of one BSS includes identification information of the BSS that includes BSSID, BSS Color (a code string used for identifying BSS), a supported operation mode, a bandwidth, a data rate and various functions supported, etc.

A Coordinated Multiple Points (CoMP) technology refers to that multiple Points form a CoMP cooperating set, which is also called a CoMP cooperating collection. FIG. 3 is a schematic diagram of CoMP transmission according to the related art. As shown in FIG. 3, uplink cooperating transmission refers to that multiple points forming a CoMP cooperating set receive data from a terminal together, and consolidate (merge) the data received by the multiple points into the finally received data through a certain strategy.

However, in the current WLAN network, one station is only associated with one AP at the same time, such that the CoMP transmission is difficult to be applied in a WLAN system.

At current, no relevant solutions are given direct to the problem that the CoMP transmission is difficult to be implemented in the WLAN system in the related art.

This section provides background information related to the present disclosure which is not necessarily prior art.

SUMMARY

The embodiments of the present disclosure provide a grouping management method, apparatus and system in coordinated multiple points (CoMP) to at least solve the problem in the related art that CoMP transmission is difficult to be implemented in the WLAN system.

According to an embodiment of the present disclosure, there is provided a grouping management method in coordinated multiple points (CoMP), including: transmitting, by an access point, identification information of the access point to a station, wherein the identification information is used for identifying a static CoMP cooperating set to which the access point belongs; receiving, by the access point, an acknowledgment request message of a dynamic CoMP cooperating set transmitted by the station, wherein the acknowledgment request message of the dynamic CoMP cooperating set contains information of candidate members belonging to the same dynamic CoMP cooperating set with the access point; and determining, by the access point, whether to form a dynamic CoMP cooperating set with some or all of the candidate members, and feeding back acknowledgment information of the dynamic CoMP cooperating set.

Optionally, the identification information includes at least one of the followings: a MAC address of one member in the static CoMP cooperating set; a BSS Color of one member in the static CoMP cooperating set; a MAC address of the static CoMP cooperating set; a temporary ESSID character string; and a predefined code field.

Optionally, the transmitting, by the access point, the identification information of the access point to the station includes: transmitting, by the access point, the identification information of the access point to the station in the form of a broadcast frame or a unicast frame, wherein the identification information is carried in one of the following locations: in a physical frame header of the broadcast frame or the unicast frame; in a MAC frame header of the broadcast frame or the unicast frame; and in a data field of the broadcast frame or the unicast frame.

Optionally, the method, before the transmitting, by the access point, the identification information of the access point to the station, further includes: transmitting, by the access point, information indicating that the access point enables a CoMP function to the station in the form of a broadcast frame or a unicast frame.

Optionally, the method further includes: transmitting, by the access point, a transmitting power parameter of the broadcast frame or the unicast frame to the station in the form of a broadcast frame or a unicast frame, wherein the transmitting power parameter is used for the station to calculate a path loss by measuring a received signal strength.

Optionally, before the receiving, by the access point, the acknowledgment request message of the dynamic CoMP cooperating set transmitted by the station, the method further includes: transmitting, by the access point, information of members in the static CoMP cooperating set to the station in the form of a broadcast frame or a unicast frame.

Optionally, the method, before the transmitting, by the access point, the identification information of the access point to the station, further includes: receiving, by the access point, a scanning request message transmitted by the station; feeding back, by the access point, information of one or more static CoMP cooperating sets containing the access point according to the scanning request message; or, feeding back, by the access point, information of one or more corresponding static CoMP cooperating sets containing designated identification information according to the scanning request message; wherein the information of the static CoMP cooperating set contains identification information of the static CoMP cooperating set and information of one or more members in the static CoMP cooperating set.

Optionally, the determining, by the access point, whether to form a dynamic CoMP cooperating set with some or all of the candidate members includes: determining, by the access point, whether to form a dynamic CoMP cooperating set with some or all of the candidate members according to local information; or, determining, by the access point, whether to form a dynamic CoMP cooperating set with some or all of the candidate members via a network.

Optionally, the determining, by the access point, whether to form a dynamic CoMP cooperating set with some or all of the candidate members according to the local information includes: judging, by the access point, whether the members contained in the acknowledgment request message of the dynamic CoMP cooperating set can support CoMP transmission of the station, and determining whether to form a dynamic CoMP cooperating set with some or all of the candidate members according to a judgment result.

Optionally, the acknowledgment information of the dynamic CoMP cooperating set includes at least one of the followings: identification information indicating successful establishment of the dynamic CoMP cooperating set; identification information indicating unsuccessful establishment of the dynamic CoMP cooperating set; identification information of members in the dynamic CoMP cooperating set, wherein the members in the dynamic CoMP cooperating set are some or all of the candidate members belonging to the same dynamic CoMP cooperating set with the access point; and configuration parameters of the members in the dynamic CoMP cooperating set.

Optionally, the identification information of the dynamic CoMP cooperating set includes at least one of the followings: a MAC address of one member in the dynamic CoMP cooperating set; a BSS Color of one member in the dynamic CoMP cooperating set; a MAC address of the dynamic CoMP cooperating set; a temporary ESSID character string; and a predefined code field.

Optionally, the determining, by the access point, whether to form a dynamic CoMP cooperating set with some or all of the candidate members, and feeding back the acknowledgment information of the dynamic CoMP cooperating set includes: in the case that the access point determines to form a dynamic CoMP cooperating set with some or all of the candidate members, carrying, by the access point, the identification information indicating successful establishment of the dynamic CoMP cooperating set in the feedback acknowledgment information of the dynamic CoMP cooperating set and carrying the configuration parameters of the members in the dynamic CoMP cooperating set, wherein the configuration parameters include at least one of an effective period of the dynamic CoMP cooperating set and an effective time of the dynamic CoMP cooperating set; and in the case that the access point determines that a dynamic CoMP cooperating set cannot be formed, carrying, by the access point, the identification information indicating unsuccessful establishment of the dynamic CoMP cooperating set in the feedback acknowledgment information of the dynamic CoMP cooperating set.

Optionally, the method, before the feeding back, by the access point, the acknowledgment information of the dynamic CoMP cooperating set, further includes: interacting, by the access point, with the candidate members via a network to determine whether the candidate members can support competency requirements or performance requirements carried in the acknowledgment request message of the dynamic CoMP cooperating set; and if the candidate members can support the competency requirements or performance requirements, establishing, by the access point, the dynamic CoMP cooperating set via the network, and triggering the members in the dynamic CoMP cooperating set to complete at least one of parameter configuration and initialization operations before CoMP transmission.

Optionally, the feeding back, by the access point, the acknowledgment information of the dynamic CoMP cooperating set includes: feeding back, by the access point, a receiving acknowledgement frame to the station, and feeding back the acknowledgment information of the dynamic CoMP cooperating set to the station after the receiving acknowledgement frame indicates that a predetermined time period is delayed; and transmitting, by the access point, the acknowledgment information of the dynamic CoMP cooperating set to the station when or after the predetermined time period.

Optionally, the determining, by the access point, whether to form a dynamic CoMP cooperating set with some or all of the candidate members via the network includes: forwarding, by the access point, all or some contents of the acknowledgment request message of the dynamic CoMP cooperating set to a network controller, wherein the network controller is configured to judge whether the members contained in the acknowledgment request message of the dynamic CoMP cooperating set can support CoMP transmission of the station and feed back the acknowledgment information of the dynamic CoMP cooperating set to the access point according to a judgment result; and feeding back, by the access point, the acknowledgment information of the dynamic CoMP cooperating set to the station.

Optionally, the feeding back, by the access point, the acknowledgment information of the dynamic CoMP cooperating set to the station includes: receiving, by the access point, the acknowledgment information of the dynamic CoMP cooperating set transmitted by the network controller; and forwarding, by the access point, the acknowledgment information of the dynamic CoMP cooperating set to the station, or repackaging by the access point, the acknowledgment information of the dynamic CoMP cooperating set into a radio frame and then transmitting the acknowledgment information of the dynamic CoMP cooperating set to the station.

Optionally, the network controller is also configured to judge whether the candidate members can support competency requirements or performance requirements carried in the acknowledgment request message of the dynamic CoMP cooperating set; and if the candidate members can support the competency requirements or performance requirements, establish the dynamic CoMP cooperating set via the network, and trigger the members in the dynamic CoMP cooperating set to complete at least one of parameter configuration and initialization operations before CoMP transmission.

According to another embodiment of the present disclosure, there is provided a grouping management method in coordinated multiple points (CoMP), including: receiving, by a station, identification information transmitted by an access point, wherein the identification information is used for identifying a static CoMP cooperating set to which the access point belongs; transmitting, by the station, an acknowledgment request message of a dynamic CoMP cooperating set to the access point, wherein the acknowledgment request message of the dynamic CoMP cooperating set contains information of candidate members belonging to the same dynamic CoMP cooperating set with the access point; and receiving, by the station, the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members.

Optionally, the method, before the receiving, by the station, the identification information transmitted by the access point, further includes: transmitting, by the station, a scanning request message to the access point, wherein the scanning request message is used for indicating the access point to feed back information of one or more static CoMP cooperating sets containing the access point, or used for indicating the access point to feed back information of one or more corresponding static CoMP cooperating sets containing designated identification information; wherein the information of the static CoMP cooperating set contains identification information of the static CoMP cooperating set and information of one or more members in the static CoMP cooperating set.

Optionally, the method, before the receiving, by the station, the identification information transmitted by the access point, further includes: intercepting, by the station, a broadcast frame on a predetermined channel to acquire information of one or more static CoMP cooperating sets containing the access point transmitted by the access point or acquire information of one or more corresponding static CoMP cooperating sets containing designated identification information transmitted by the access point; wherein the information of the static CoMP cooperating set contains identification information of the static CoMP cooperating set and information of one or more members in the static CoMP cooperating set.

Optionally, the scanning request message is also used for indicating to feed back whether the access point supports a CoMP function.

Optionally, the method, before the transmitting, by the station, the acknowledgment request message of the dynamic CoMP cooperating set to the access point on the basis of the identification information, further includes: acquiring, by the station, feedback information or multiple feedback results of the scanning request message, and respectively combining multiple access points into one or more candidate dynamic cooperating sets with reference to system parameters acquired and signal parameters measured during scanning.

Optionally, the system parameters include at least one of the followings: an access point transmitting power parameter, load information and access control information.

Optionally, the signal parameters include at least one of the followings: received signal strength information and received signal quality information.

Optionally, the acknowledgment request message of the dynamic CoMP cooperating set further includes at least one of the followings: an expected effective period of the dynamic CoMP cooperating set; an effective time of the dynamic CoMP cooperating set; and QoS parameters needing to be supported by the dynamic CoMP cooperating set.

Optionally, the method, after the receiving, by the station, the acknowledgment information of the dynamic CoMP cooperating set fed back by the access point, further includes: determining, by the station, members of the dynamic CoMP cooperating set according to the acknowledgment information of the dynamic CoMP cooperating set, and using the dynamic CoMP cooperating set to perform CoMP transmission.

Optionally, the method, before the receiving, by the station, the acknowledgment information of the dynamic CoMP cooperating set fed back by the access point, further includes: receiving, by the station, a receiving acknowledgement frame fed back by the access point, the receiving acknowledgement frame indicating that the access point will feed back acknowledgment information of the dynamic CoMP cooperating set to the station after a predetermined time period; and receiving, by the station, the acknowledgment information of the dynamic CoMP cooperating set transmitted by the access point when or after the predetermined time period.

According to another embodiment of the present disclosure, there is provided a grouping management apparatus in coordinated multiple points (CoMP) located in an access point, including: a first transmitting module configured to transmit identification information of the access point to a station, wherein the identification information is used for identifying a static CoMP cooperating set to which the access point belongs; a first receiving module configured to receive an acknowledgment request message of a dynamic CoMP cooperating set transmitted by the station, wherein the acknowledgment request message of the dynamic CoMP cooperating set contains information of candidate members belonging to the same dynamic CoMP cooperating set with the access point; and a second transmitting module configured to determine whether to form a dynamic CoMP cooperating set with some or all of the candidate members, and feed back acknowledgment information of the dynamic CoMP cooperating set.

Optionally, the identification information includes at least one of the followings: a media access control MAC address of one member in the static CoMP cooperating set; a basic service set BSS Color of one member in the static CoMP cooperating set; a MAC address of the static CoMP cooperating set; a temporary ESSID character string; and a predefined code field.

Optionally, the first transmitting module is configured to transmit the identification information of the access point to the station in the form of a broadcast frame or a unicast frame, wherein the identification information is carried in one of the following locations: in a physical frame header of the broadcast frame or the unicast frame; in a MAC frame header of the broadcast frame or the unicast frame; and in a data field of the broadcast frame or the unicast frame.

Optionally, the apparatus further includes: a control module configured to transmit information indicating that the access point enables a CoMP function to the station in the form of a broadcast frame or a unicast frame.

Optionally, the apparatus further includes: a power control module configured to transmit a transmitting power parameter of the broadcast frame or the unicast frame to the station in the form of a broadcast frame or a unicast frame, wherein the transmitting power parameter is used for the station to calculate a path loss by measuring a received signal strength.

Optionally, the apparatus further includes: a fourth transmitting module configured to transmit information of members in the static CoMP cooperating set to the station in the form of a broadcast frame or a unicast frame.

Optionally, the apparatus further includes: a feedback module configured to receive a scanning request message transmitted by the station; and feed back information of one or more static CoMP cooperating sets containing the access point according to the scanning request message, or feed back information of one or more corresponding static CoMP cooperating sets containing designated identification information according to the scanning request message; wherein the information of the static CoMP cooperating set contains identification information of the static CoMP cooperating set and information of one or more members in the static CoMP cooperating set.

Optionally, the second transmitting module includes: a first determination unit configured to determine whether to form a dynamic CoMP cooperating set with some or all of the candidate members according to local information; or a second determination unit configured to determine whether to form a dynamic CoMP cooperating set with some or all of the candidate members via a network.

Optionally, the second determination unit is also configured to judge whether the members contained in the acknowledgment request message of the dynamic CoMP cooperating set can support CoMP transmission of the station, and determine whether to form a dynamic CoMP cooperating set with some or all of the candidate members according to a judgment result.

Optionally, the acknowledgment information of the dynamic CoMP cooperating set includes at least one of the followings: identification information indicating successful establishment of the dynamic CoMP cooperating set; identification information indicating unsuccessful establishment of the dynamic CoMP cooperating set; identification information of members in the dynamic CoMP cooperating set, wherein the members in the dynamic CoMP cooperating set are some or all of the candidate members belonging to the same dynamic CoMP cooperating set with the access point; identification information of the dynamic CoMP cooperating set; and configuration parameters of the members in the dynamic CoMP cooperating set.

Optionally, the identification information of the dynamic CoMP cooperating set includes at least one of the followings: a MAC address of one member in the dynamic CoMP cooperating set; a BSS Color of one member in the dynamic CoMP cooperating set; a MAC address of the dynamic CoMP cooperating set; a temporary ESSID character string; and a predefined code field.

Optionally, the second transmitting module is also configured to: in the case of determining to form a dynamic CoMP cooperating set with some or all of the candidate members, carry the identification information indicating successful establishment of the dynamic CoMP cooperating set in the feedback acknowledgment information of the dynamic CoMP cooperating set and carry the configuration parameters of the members in the dynamic CoMP cooperating set, wherein the configuration parameters include at least one of an effective period of the dynamic CoMP cooperating set and an effective time of the dynamic CoMP cooperating set; and in the case of determining that a dynamic CoMP cooperating set cannot be formed, carry the identification information indicating unsuccessful establishment of the dynamic CoMP cooperating set in the feedback acknowledgment information of the dynamic CoMP cooperating set.

Optionally, the apparatus further includes: an interacting module configured to interact with the candidate members via a network to determine whether the candidate members can support competency requirements or performance requirements carried in the acknowledgment request message of the dynamic CoMP cooperating set; and if the candidate members can support the competency requirements or performance requirements, establish the dynamic CoMP cooperating set via the network, and trigger the members in the dynamic CoMP cooperating set to complete at least one of parameter configuration and initialization operations before CoMP transmission.

Optionally, the acknowledgment information of the dynamic CoMP cooperating set includes: information of the members forming a dynamic CoMP cooperating set with the access point, wherein the members forming a dynamic CoMP cooperating set with the access point are some or all of the candidate members belonging to the same dynamic CoMP cooperating set with the access point.

Optionally, the second transmitting module is also configured to feed back a receiving acknowledgement frame to the station, and feed back the acknowledgment information of the dynamic CoMP cooperating set to the station after the receiving acknowledgement frame indicates that a predetermined time period is delayed; and transmit the acknowledgment information of the dynamic CoMP cooperating set to the station when or after the predetermined time period.

Optionally, the apparatus further includes: a forwarding module configured to forward all or some contents of the acknowledgment request message of the dynamic CoMP cooperating set to a network controller, wherein the network controller is configured to judge whether the members contained in the acknowledgment request message of the dynamic CoMP cooperating set can support CoMP transmission of the station and feed back the acknowledgment information of the dynamic CoMP cooperating set to the access point according to a judgment result; and feed back the acknowledgment information of the dynamic CoMP cooperating set to the station.

Optionally, the forwarding module is also configured to receive the acknowledgment information of the dynamic CoMP cooperating set transmitted by the network controller; and forward the acknowledgment information of the dynamic CoMP cooperating set to the station, or repackage the acknowledgment information of the dynamic CoMP cooperating set into a radio frame and then transmit the acknowledgment information of the dynamic CoMP cooperating set to the station.

Optionally, the network controller is also configured to judge whether the candidate members can support competency requirements or performance requirements carried in the acknowledgment request message of the dynamic CoMP cooperating set; and if the candidate members can support the competency requirements or performance requirements, establish the dynamic CoMP cooperating set via the network, and trigger the members in the dynamic CoMP cooperating set to complete at least one of parameter configuration and initialization operations before CoMP transmission.

According to another embodiment of the present disclosure, there is also provided a grouping management apparatus in coordinated multiple points (CoMP) located in a station, including: a second receiving module configured to receive identification information transmitted by an access point, wherein the identification information is used for identifying a static CoMP cooperating set to which the access point belongs; a third transmitting module configured to transmit an acknowledgment request message of a dynamic CoMP cooperating set to the access point, wherein the acknowledgment request message of the dynamic CoMP cooperating set contains information of candidate members belonging to the same dynamic CoMP cooperating set with the access point; and a third receiving module configured to receive the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members.

Optionally, the apparatus further includes: a fifth transmitting module configured to transmit a scanning request message to the access point, wherein the scanning request message is used for indicating the access point to feed back information of one or more static CoMP cooperating sets containing the access point, or used for indicating the access point to feed back information of one or more corresponding static CoMP cooperating sets containing designated identification information; wherein the information of the static CoMP cooperating set contains identification information of the static CoMP cooperating set and information of one or more members in the static CoMP cooperating set.

Optionally, the apparatus further includes: an intercepting module configured to intercept a broadcast frame on a predetermined channel to acquire information of one or more static CoMP cooperating sets containing the access point transmitted by the access point or acquire information of one or more corresponding static CoMP cooperating sets containing designated identification information transmitted by the access point; wherein the information of the static CoMP cooperating set contains identification information of the static CoMP cooperating set and information of one or more members in the static CoMP cooperating set.

Optionally, the scanning request message is also used for indicating to feed back whether the access point supports a CoMP function.

Optionally, the apparatus further includes: a combining module configured to acquire feedback information or multiple feedback results of the scanning request message, and respectively combine multiple access points into one or more candidate dynamic cooperating sets with reference to system parameters acquired and signal parameters measured during scanning.

Optionally, the system parameters include at least one of the followings: an access point transmitting power parameter, load information and access control information.

Optionally, the signal parameters include at least one of the followings: received signal strength information and received signal quality information.

Optionally, the acknowledgment request message of the dynamic CoMP cooperating set further includes at least one of the followings: an expected effective period of the dynamic CoMP cooperating set; an effective time of the dynamic CoMP cooperating set; and QoS parameters needing to be supported by the dynamic CoMP cooperating set.

Optionally, the apparatus further includes: a determination module configured to determine members of the dynamic CoMP cooperating set according to the acknowledgment information of the dynamic CoMP cooperating set, and use the dynamic CoMP cooperating set to perform CoMP transmission.

Optionally, the apparatus further includes: a fourth receiving module configured to receive a receiving acknowledgement frame fed back by the access point, and then feed back the acknowledgment information of the dynamic CoMP cooperating set to the station after the receiving acknowledgement frame indicates that a predetermined time period is delayed; and receive the acknowledgment information of the dynamic CoMP cooperating set transmitted by the access point when or after the predetermined time period.

According to another embodiment of the present disclosure, there is also provided a grouping management system in coordinated multiple points (CoMP), including the grouping management apparatus in coordinated multiple points (CoMP) located in an access point and the grouping management apparatus in coordinated multiple points (CoMP) located in a station mentioned above.

According to one another embodiment of the present disclosure, there is also provided an access point, including: a first processor; a first memory configured to store executable instructions of the first processor; and a first transmitting device for receiving and transmitting information according to the control of the first processor; wherein the first processor is configured to control the first transmitting device to execute following operations: transmitting identification information of the access point to a station, wherein the identification information is used for identifying a static CoMP cooperating set to which the access point belongs; receiving an acknowledgment request message of a dynamic CoMP cooperating set transmitted by the station on the basis of the identification information, wherein the acknowledgment request message of the dynamic CoMP cooperating set contains candidate members belonging to the same dynamic CoMP cooperating set with the access point; and determining whether to form a dynamic CoMP cooperating set with some or all of the candidate members, and feeding back acknowledgment information of the dynamic CoMP cooperating set.

According to one another embodiment of the present disclosure, there is also provided a station, including: a second processor; a second memory configured to store executable instructions of the second processor; and a second transmitting device for receiving and transmitting information according to the control of the second processor; wherein the second processor is configured to control the second transmitting device to execute following operations: receiving identification information transmitted by an access point, wherein the identification information is used for identifying a static CoMP cooperating set to which the access point belongs; transmitting an acknowledgment request message of a dynamic CoMP cooperating set to the access point on the basis of the identification information, wherein the acknowledgment request message of the dynamic CoMP cooperating set contains candidate members belonging to the same dynamic CoMP cooperating set with the access point; and receiving the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members belonging to the same dynamic CoMP cooperating set with the access point.

According to one another embodiment of the present disclosure, there is also provided a coordinated multiple points (CoMP) system, including the access point and the station mentioned above.

According to another embodiment of the present disclosure, there is also provided a storage medium. The storage medium is configured to store program codes for executing the following steps: transmitting, by an access point, identification information of the access point to a station, wherein the identification information is used for identifying a static CoMP cooperating set to which the access point belongs; receiving, by the access point, an acknowledgment request message of a dynamic CoMP cooperating set transmitted by the station on the basis of the identification information, wherein the acknowledgment request message of the dynamic CoMP cooperating set contains candidate members belonging to the same dynamic CoMP cooperating set with the access point; and determining, by the access point, whether to form a dynamic CoMP cooperating set with some or all of the candidate members, and feeding back acknowledgment information of the dynamic CoMP cooperating set.

Optionally, the storage medium is also configured to store program codes for executing the following steps: receiving, by a station, identification information transmitted by an access point, wherein the identification information is used for identifying a static CoMP cooperating set to which the access point belongs; transmitting, by the station, an acknowledgment request message of a dynamic CoMP cooperating set to the access point on the basis of the identification information, wherein the acknowledgment request message of the dynamic CoMP cooperating set contains candidate members belonging to the same dynamic CoMP cooperating set with the access point; and receiving, by the station, the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members belonging to the same dynamic CoMP cooperating set with the access point.

According to one another embodiment of the present disclosure, there is also provided a processor configured to run a program, wherein the program executes any one of the methods mentioned above during running.

According to the embodiments of the present disclosure, because the CoMP cooperating sets are divided into the static CoMP cooperating set and the dynamic CoMP cooperating set, the access point transmits the static CoMP cooperating set to which the access point belongs to the station, the station determines the information of the candidate members belonging to the same dynamic CoMP cooperating set with the access point on the basis of the static CoMP cooperating set to which the access point belongs and other parameters, and obtains the final dynamic CoMP cooperating set through the acknowledgment of the access point; therefore, the present disclosure solves the problem in the related art that the CoMP transmission is difficult to be implemented in the WLAN system, can effectively implement the management and fast selection of the CoMP transmission sets as well as dynamic generation of effective grouping, and improve the grouping management efficiency of the CoMP transmission.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings illustrated here serve to provide a further understanding of the present disclosure and constitute a part of the application, and the illustrative embodiments of the present disclosure and together with the description thereof serve to explain the present disclosure, and do not constitute inappropriate definition to the present disclosure. In the drawings.

DETAILED DESCRIPTION

The present disclosure will be explained in detail with reference to the accompanying drawings and embodiments hereinafter. It should be noted that, in case of no conflict, the embodiments in the present application and the features in the embodiments may be combined with each other.

It should be noted that the terms "first", "second" and the like in the description and claims of the present disclosure as well as the above drawings are used to distinguish similar objects, and are not necessarily used to describe a specific sequence or a chronological order.

Method Embodiments

Figure 1:
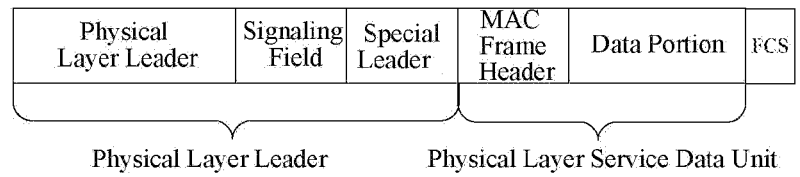
FIG. 1 is a schematic diagram illustrating a basic structure of a radio frame according to the related art.
Figure 2:
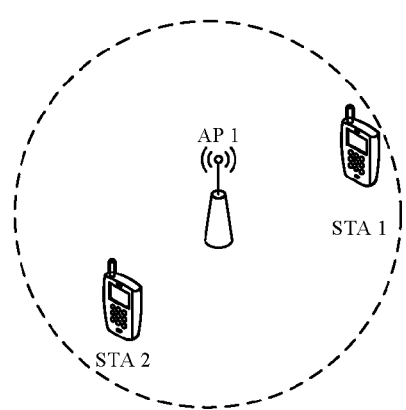
FIG. 2 is a schematic diagram illustrating a basic service set (BSS) of WLAN according to the related art.
Figure 3:
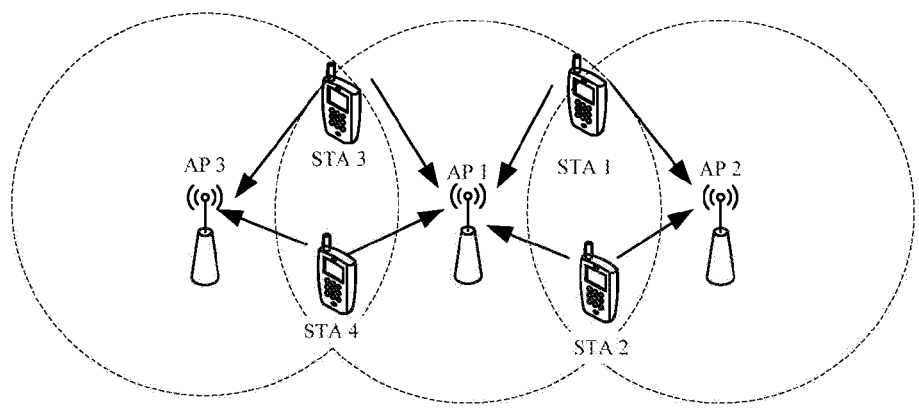
FIG. 3 is a schematic diagram of CoMP transmission according to the related art.
Figure 4:
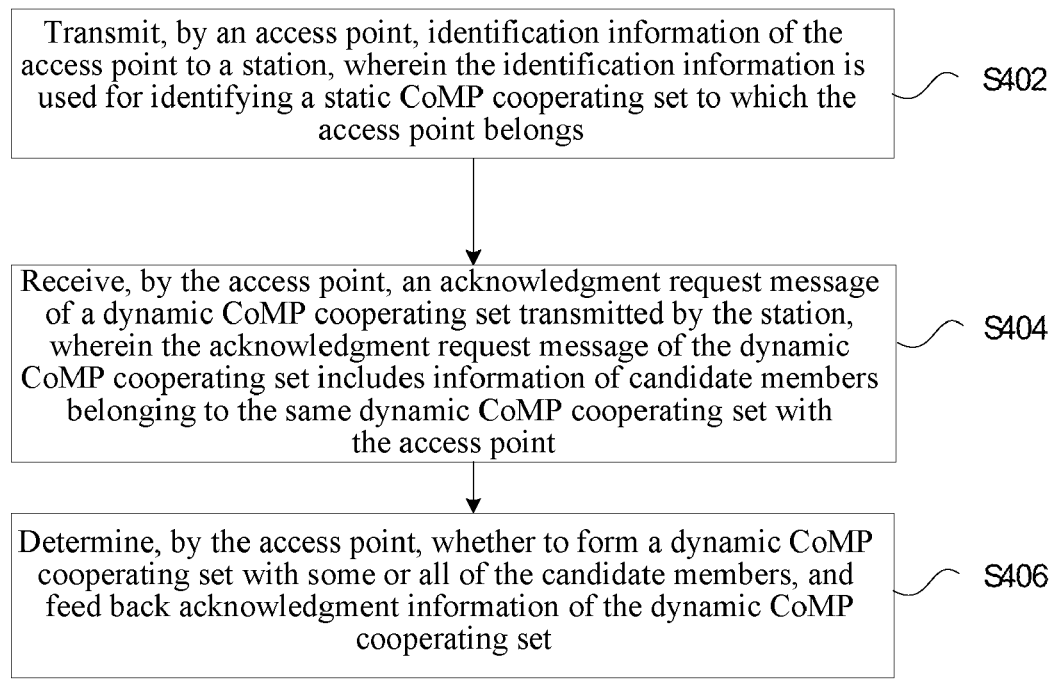
FIG. 4 is a flow chart of a grouping management method in coordinated multiple points (CoMP) according to an embodiment of the present disclosure.

In the embodiment, there is provided a grouping management method in coordinated multiple points (CoMP) that is running in a network architecture of a Wireless Local Area Network (WLAN) (referring to FIG. 2 and FIG. 3). FIG. 4 is a flow chart of a grouping management method in coordinated multiple points (CoMP) according to the embodiment of the present disclosure. As shown in FIG. 4, the process includes the following steps.

In step S402, an access point transmits identification information of the access point to a station, wherein the identification information is used for identifying a static CoMP cooperating set to which the access point belongs.

In step S404, the access point receives an acknowledgment request message of a dynamic CoMP cooperating set transmitted by the station, wherein the acknowledgment request message of the dynamic CoMP cooperating set includes information of candidate members belonging to the same dynamic CoMP cooperating set with the access point.

In step S406, the access point determines whether to form a dynamic CoMP cooperating set with some or all of the candidate members, and feeds back acknowledgment information of the dynamic CoMP cooperating set.

In the present embodiment, the access point transmits the identification information of the access point to the station; the access point receives the acknowledgment request message of the dynamic CoMP cooperating set transmitted by the station; and the access point determines whether to form a dynamic CoMP cooperating set with some or all of the candidate members, and feeds back through the acknowledgment information of the dynamic CoMP cooperating set. Through the steps above, the present embodiment divides the CoMP cooperating sets into the static CoMP cooperating set and the dynamic CoMP cooperating set, the access point transmits the static CoMP cooperating set to which the access point belongs to the station, the station determines the information of the candidate members belonging to the same dynamic CoMP cooperating set with the access point on the basis of the static CoMP cooperating set to which the access point belongs and other parameters, and obtains the final dynamic CoMP cooperating set through the acknowledgment of the access point; therefore, the present disclosure solves the problem in the related art that the CoMP transmission is difficult to be implemented in the WLAN system, combines the multiple access point members in the dynamic CoMP cooperating set into the CoMP cooperating set, so as to implement CoMP, and can effectively implement the management and fast selection of the CoMP transmission sets as well as dynamic generation of effective grouping, and improve the management efficiency of the CoMP transmission grouping.

It should be noted that in the above embodiments, the name "static CoMP cooperating set" is the name of the CoMP cooperating set to which the access point belongs, and is not used to limit the CoMP cooperating set to which the access point belongs. The name of the CoMP cooperating set to which the access point belongs may also be replaced by other names, for example, the name "first CoMP cooperating set" may be used instead of the "static CoMP cooperating set"; similarly, the name "dynamic CoMP cooperating set" may also be replaced by other names, for example, the name "second CoMP cooperating set" may be used instead of the "dynamic CoMP cooperating set".

It should be noted that the above step S404 may be initiated by the station actively, then the transmitting, by the access point, the identification information in step S402 may be a pre-condition or a parallel operation of step S404, rather than a triggering condition. That is, the above step S402 may occur before step S404 or may occur simultaneously with step S404.

Optionally, the static CoMP cooperating set is a preset CoMP cooperating set, and each AP in the static CoMP cooperating set maintains interconnection and intercommunication through a background network; the dynamic CoMP cooperating set is a CoMP cooperating set bound with one station on the basis of the current scene, and each AP in the dynamic CoMP cooperating set maintains interconnection and intercommunication under the current scene or requirement, and may support the cooperating transmission of the bound station.

Optionally, the identification information may include, but is not limited to at least one of the followings: a MAC address of one member in the static CoMP cooperating set; a BSS Color of one member in the static CoMP cooperating set; a MAC address of the static CoMP cooperating set; an Extended Service Set Identifier (ESSID) character string; and a predefined code field.

Optionally, the access point may transmit the identification information of the access point to the station in the form of a broadcast frame or a unicast frame, wherein the identification information is carried in one of the following locations: in a physical frame head of the broadcast frame or the unicast frame; in a MAC frame head of the broadcast frame or the unicast frame; and in a data field of the broadcast frame or the unicast frame.

Optionally, before the transmitting, by the access point, the identification information of the access point to the station, the access point may also transmit information indicating that the access point enables a corresponding function (i.e., CoMP function) of the above-mentioned CoMP management to the station in the form of a broadcast frame or a unicast frame.

Optionally, the access point may also transmit a transmitting power parameter of the broadcast frame or the unicast frame to the station in the form of a broadcast frame or a unicast frame, wherein the transmitting power parameter is used for the station to calculate a path loss by measuring a received signal strength, thus calculating whether this access point can support uplink CoMP transmission.

Optionally, before the receiving, by the access point, the acknowledgment request message of the dynamic CoMP cooperating set transmitted by the station, the access point may also transmit information of members in the static CoMP cooperating set to the station in the form of a broadcast frame or a unicast frame.

Optionally, before the transmitting, by the access point, the identification information of the access point to the station in step S402, the access point may also firstly receive a scanning request message transmitted by the station.

The access point may feed back information of one or more static CoMP cooperating sets containing the access point according to the scanning request message (for example, requirements carried in the message); or, the access point may also feed back information of one or more corresponding static CoMP cooperating sets containing designated identification information according to the scanning request message (for example, requirements carried in the message); wherein the information of the static CoMP cooperating set contains identification information of the static CoMP cooperating set and information of one or more members in the static CoMP cooperating set.

Optionally, the determining, by the access point, whether to form a dynamic CoMP cooperating set with some or all of the candidate members includes: determining, by the access point, whether to form a dynamic CoMP cooperating set with some or all of the candidate members according to local information; or, determining, by the access point, whether to form a dynamic CoMP cooperating set with some or all of the candidate members via a network.

Optionally, the determining, by the access point, whether to form a dynamic CoMP cooperating set with some or all of the candidate members according to local information may be as follows: the access point may judge whether the members contained in the acknowledgment request message of the dynamic CoMP cooperating set can support CoMP transmission of the station firstly, and then determine whether to form a dynamic CoMP cooperating set with some or all of the candidate members according to a judgment result.

Optionally, the acknowledgment information of the dynamic CoMP cooperating set may include at least one of the followings: identification information indicating successful establishment of the dynamic CoMP cooperating set; identification information indicating unsuccessful establishment of the dynamic CoMP cooperating set; identification information of members in the dynamic CoMP cooperating set, wherein the members in the dynamic CoMP cooperating set are some or all of the candidate members belonging to the same dynamic CoMP cooperating set with the access point; identification information of the dynamic CoMP cooperating set; and a configuration parameter of the members in the dynamic CoMP cooperating set.

Optionally, the identification information of the dynamic CoMP cooperating set may include at least one of the followings: a MAC address of one member in the dynamic CoMP cooperating set; a BSS Color of one member in the dynamic CoMP cooperating set; a MAC address of the dynamic CoMP cooperating set; a temporary ESSID character string; and a predefined code field. It should be noted that the ESSID character string contained in the identification information of the static CoMP cooperating set is not a temporary ESSID, while the ESSID character string contained in the identification information of the dynamic CoMP cooperating set is a temporary ESSID. The ESSID assigned by the access point is generally preconfigured, so that the ESSID may be used in the static set. The ESSID in the dynamic set is generated according to the transmission requirements of the station and may be released after the cooperating transmission of the station is received; therefore, the ESSID in the dynamic set is a temporary ESSID.

Optionally, in the case that the access point determines to form a dynamic CoMP cooperating set with some or all of the candidate members, the access point carries the identification information indicating successful establishment of the dynamic CoMP cooperating set and the configuration parameters of the members in the dynamic CoMP cooperating set in the feedback acknowledgment information of the dynamic CoMP cooperating set, wherein the configuration parameter includes at least one of an effective period of the dynamic CoMP cooperating set and an effective time of the dynamic CoMP cooperating set; and in the case that the access point determines that a dynamic CoMP cooperating set cannot be formed, the access point carries the identification information indicating unsuccessful establishment of the dynamic CoMP cooperating set in the feedback acknowledgment information of the dynamic CoMP cooperating set.

As a preferred embodiment, before the feeding back, by the access point, the acknowledgment information of the dynamic CoMP cooperating set, the access point may also interact with the candidate members via a network to determine whether the candidate members can support competency requirements or performance requirements carried in the acknowledgment request message of the dynamic CoMP cooperating set; and if the candidate members can support the competency requirements or performance requirements, then the access point may establish the dynamic CoMP cooperating set via the network, and trigger the members in the dynamic CoMP cooperating set to complete at least one of parameter configuration and initialization operations before CoMP transmission.

Optionally, the acknowledgment information of the dynamic CoMP cooperating set may include: information of the member(s) forming a dynamic CoMP cooperating set with the access point, wherein the member(s) forming a dynamic CoMP cooperating set with the access point are some or all of the candidate members belonging to the same dynamic CoMP cooperating set with the access point.

As a preferred embodiment, the access point feeds back a receiving acknowledgement frame to the station, and indicates in the receiving acknowledgement frame that the acknowledgment information of the dynamic CoMP cooperating set will be fed back to the station after a predetermined time period; and then when the predetermined time period arrives, or after the predetermined time period, the access point may transmit the acknowledgment information of the dynamic CoMP cooperating set to the station.

As a preferred embodiment, whether the access point forming a dynamic CoMP cooperating set with some or all of the candidate members belonging to the same dynamic CoMP cooperating set with the access point may either be judged by the access point independently, or be correlatively judged by a network controller, and a judgment result is transmitted to the access point. For the latter case, specifically, before feeding back, by the access point, the acknowledgment information of the dynamic CoMP cooperating set, the access point may forward all or some contents of the acknowledgment request message of the dynamic CoMP cooperating set to a network controller, and the network controller judges whether the member(s) contained in the acknowledgment request message of the dynamic CoMP cooperating set can support CoMP transmission of the station and feeds back the acknowledgment information of the dynamic CoMP cooperating set to the access point according to a judgment result; and then the access point feeds back the acknowledgment information of the dynamic CoMP cooperating set to the station.

Optionally, the feeding back, by the network controller, the acknowledgment information of the dynamic CoMP cooperating set to the station according to the judgment result may include the following ways: the network controller transmits the acknowledgment information of the dynamic CoMP cooperating set to the access point, and then the access point forwards the acknowledgment information of the dynamic CoMP cooperating set to the station; or, the network controller transmits the acknowledgment information of the dynamic CoMP cooperating set to the access point, and the access point repackages the acknowledgment information of the dynamic CoMP cooperating set into a new radio frame, and then transmits the radio frame to the station.

Optionally, the network controller may also judge whether the candidate member(s) belonging to the same dynamic CoMP cooperating set with the access point can support a competency requirement or a performance requirement carried in the acknowledgment request message of the dynamic CoMP cooperating set; and if the candidate member(s) can support the competency requirement or performance requirement, then the network controller may establish the dynamic CoMP cooperating set via the network, and trigger the member(s) in the dynamic CoMP cooperating set to complete parameter configuration and/or initialization operations before CoMP transmission.

Optionally, after successfully establishing the dynamic CoMP cooperating set, the dynamic CoMP cooperating set may be managed through a plurality of different manners to implement CoMP transmission. For example, the dynamic CoMP cooperating set may be managed by the network controller, or a certain access point in the dynamic CoMP cooperating set may be used as a master access point to manage access point(s) of other member(s). In the latter case, an identifier may be added to indicate which access point becomes the master access point, or if there is an access point associated with the station, the access point associated with the station may be automatically deemed as the master access point by default. The association between the access point and the station means maintaining a link-level connection between the access point and the station. In the cooperating transmission of the present application, except for the AP associated with the station, other AP members are not associated with the station, but are only responsible for collecting and forwarding signals according to the configuration.

Figure 5:
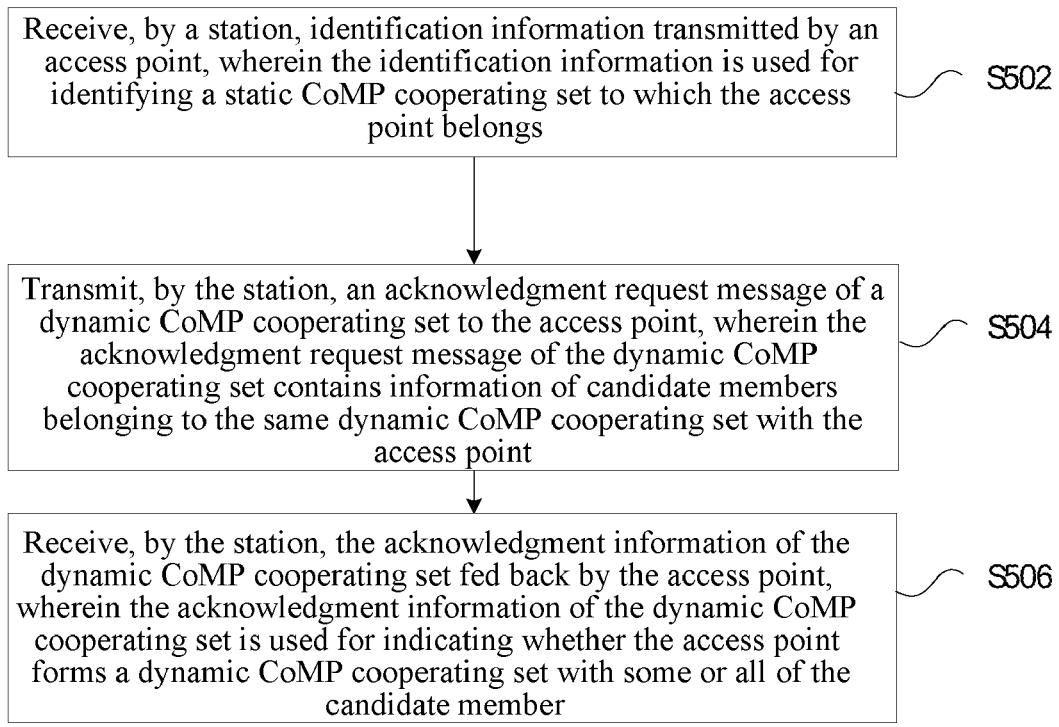
FIG. 5 is a flow chart of a grouping management method in coordinated multiple points (CoMP) according to another embodiment of the present disclosure.

In the present embodiment, there is also provided another grouping management method in coordinated multiple points (CoMP) that is running in a network architecture of a Wireless Local Area Network (WLAN) (referring to FIG. 2 and FIG. 3). FIG. 5 is a flow chart of another grouping management method in coordinated multiple points (CoMP) according to an embodiment of the present disclosure. As shown in FIG. 5, the flow chart includes the following steps.

In step S502, a station receives identification information transmitted by an access point, wherein the identification information is used for identifying a static CoMP cooperating set to which the access point belongs.

In step S504, the station transmits an acknowledgment request message of a dynamic CoMP cooperating set to the access point, wherein the acknowledgment request message of the dynamic CoMP cooperating set contains information of candidate member(s) belonging to the same dynamic CoMP cooperating set with the access point.

In step S506, the station receives acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members.

According to the above steps, the CoMP cooperating sets are divided into the static CoMP cooperating set and the dynamic CoMP cooperating set in the present embodiment, the access point transmits the static CoMP cooperating set to which the access point belongs to the station, the station determines the information of the candidate member(s) belonging to the same dynamic CoMP cooperating set with the access point on the basis of the static CoMP cooperating set to which the access point belongs and other parameter, and obtains the final dynamic CoMP cooperating set through the acknowledgment of the access point; therefore, the present disclosure solves the problem in the related art that the CoMP transmission is difficult to be implemented in the WLAN system, can effectively implement the management and fast selection of the CoMP transmission sets as well as dynamic generation of effective grouping, and improve the grouping management efficiency of the CoMP transmission.

It should be noted that the above step S504 may be initiated by the station actively, then the identification information transmitted by the access point in step S502 may be a pre-condition or a parallel operation of step S504, rather than a triggering condition. That is, the above step S502 may occur before step S504 or may occur simultaneously with step S504.

Optionally, the static CoMP cooperating set is a preset CoMP cooperating set, and each AP in the static CoMP cooperating set maintains interconnection and intercommunication through a background network; the dynamic CoMP cooperating set is a CoMP cooperating set that is temporarily divided on the basis of the current scene or requirement, and each AP in the dynamic CoMP cooperating set maintains interconnection and intercommunication under the current scene or requirement.

As a preferred embodiment, before step S502, the station may also transmit a scanning request message to the access point, wherein the scanning request message is used for indicating the access point to feed back information of one or more static CoMP cooperating sets containing the access point, or used for indicating the access point to feed back information of one or more corresponding static CoMP cooperating sets containing designated identification information.

Or, the station may intercept (monitor) a broadcast frame on a predetermined channel to acquire information of one or more static CoMP cooperating sets containing the access point transmitted by the access point or acquire information of one or more corresponding static CoMP cooperating sets containing designated identification information transmitted by the access point.

The information of the static CoMP cooperating set contains identification information of the static CoMP cooperating set and information of one or more members in the static CoMP cooperating set.

Optionally, the scanning request message is also used for indicating to feed back whether the access point supports a CoMP function.

As a preferred embodiment, before step S504, the station may acquire feedback information or multiple feedback results of the scanning request message, and respectively combine multiple access points into one or more candidate dynamic cooperating sets with reference to system parameters acquired during scanning and measured signal parameters. The system parameters may include at least one of the followings: an access point transmitting power parameter, load information and access control information. The signal parameters may include at least one of the followings: received signal strength information and received signal quality information.

Optionally, the acknowledgment request message of the dynamic CoMP cooperating set may also include at least one of the following contents: an expected effective period of the dynamic CoMP cooperating set; an effective time of the dynamic CoMP cooperating set; and a QoS parameter needing to be supported by the dynamic CoMP cooperating set.

As a preferred embodiment, in step S504, after the station receives the acknowledgment information of the dynamic CoMP cooperating set fed back by the access point, the station may determine member(s) of the dynamic CoMP cooperating set according to the acknowledgment information of the dynamic CoMP cooperating set, and use the dynamic CoMP cooperating set to perform CoMP transmission.

As a preferred embodiment, before the station receives the acknowledgment information of the dynamic CoMP cooperating set fed back by the access point, the station may also possibly receive a receiving acknowledgement frame fed back by the access point, the receiving acknowledgement frame indicating that after a predetermined time period, the access point will feed back acknowledgment information of the dynamic CoMP cooperating set to the station; in such a case, when the predetermined time period is arrived or after the predetermined time period, the station receives the acknowledgment information of the dynamic CoMP cooperating set transmitted by the access point.

The following description will be made with reference to the preferred embodiment, which combines the above-mentioned embodiments and preferred embodiments thereof.

In view of the problem in the related art that the CoMP transmission is difficult to be implemented in a WLAN system, there is provided a grouping management method in coordinated transmission on a scanning-based network discovery mechanism in the following preferred embodiment, which can effectively implement the management of network-side coordinated transmission sets and fast selection of station-side coordinated transmission sets and dynamic generation of effective grouping, and improve the management efficiency of the coordinated transmission grouping.

There is provided a scanning-based grouping management method in coordinated transmission in the preferred embodiment to at least solve the problems in the related art during station discovery and CoMP cooperating set selection.

According to an aspect of the present disclosure, there is provided a scanning-based grouping management method in coordinated transmission, including: transmitting, by an access point, identification information of a static CoMP cooperating set to which the access point belongs to a station in the form of a broadcast frame or a unicast frame; wherein, the identification information of the static CoMP cooperating set may be text information or code information.

Preferably, the identification information of the static CoMP cooperating set mentioned above may be a MAC address of one member AP in the static CoMP cooperating set, or a BSS Color of one member AP in the static CoMP cooperating set, or a MAC address of one set, or an ESSID character string, or a solely defined code field.

Preferably, the access point carries the identification information of the CoMP cooperating set mentioned above in a physical frame head, or a MAC frame head, or a data field of the transmitted broadcast frame or the transmitted unicast frame.

Optionally, the access point transmits information indicating that whether the access point enables a CoMP function to the station in the form of a broadcast frame or a unicast frame.

Optionally, the access point transmits a transmitting power parameter of the broadcast frame or the unicast frame to the station in the form of a broadcast frame or a unicast frame, so that the station can calculate a path loss by measuring a received signal strength.

Optionally, the access point transmits information of member access points in the static CoMP cooperating set to the station in the form of a broadcast frame or a unicast frame.

Preferably, after receiving a scanning request message transmitted by the station, the access point feeds back information of one or more static CoMP cooperating sets containing the access point, identification information of the static CoMP cooperating set, and information of one or more member access points according to the requirements in the scanning request.

Preferably, after receiving the scanning request message transmitted by the station, the access point feeds back information of one or more corresponding static CoMP cooperating sets containing designated identification information, identification information of the static CoMP cooperating set at least, and information of one or more member access points according to the requirements in the scanning request.

Optionally, after receiving an acknowledgment request message of a dynamic CoMP cooperating set transmitted by the station, the access point judges whether the multiple access points contained in the candidate dynamic CoMP cooperating set(s) can support CoMP transmission of the station, establishes and feeds back the acknowledgment information of the dynamic CoMP cooperating set to the station.

Preferably, the above-mentioned acknowledgment information contains information indicating that whether the dynamic CoMP cooperating set can work, information of access points forming the dynamic CoMP cooperating set, identification information of the dynamic CoMP cooperating set, a configuration parameter of each access point of the dynamic CoMP cooperating set, an effective period of the dynamic CoMP cooperating set, an effective time of the dynamic CoMP cooperating set, etc.

Preferably, the identification information of the dynamic CoMP cooperating set mentioned above may be a MAC address of one member AP in the dynamic CoMP cooperating set, or a BSS Color of one member AP in the dynamic CoMP cooperating set, or a MAC address of one set, or a temporary ESSID, or a solely defined code field.

Preferably, the access point interacts with other access points contained in the candidate dynamic CoMP cooperating set via a network to determine whether the other access points can support a competency requirement or performance requirement carried in the above-mentioned request message, and establishes the dynamic CoMP cooperating set via the network, and triggers the APs contained in the dynamic CoMP cooperating set to complete parameter configuration and initialization before CoMP transmission.

Preferably, the information of the dynamic CoMP cooperating set contained in the acknowledgement information by the access point contains the information of the member access points, and the member access points are some or all of the member access points in the corresponding candidate dynamic CoMP cooperating set in the received request message.

Preferably, before feeding back the acknowledgment information of the dynamic CoMP cooperating set mentioned above, the access point feeds back a receiving acknowledgement frame to the station firstly, and the receiving acknowledgement frame indicates that the acknowledgment information of the dynamic CoMP cooperating set mentioned above will be fed back to the station after a predetermined time period. The access point transmits the acknowledgment information of the dynamic CoMP cooperating set mentioned above to the station when the predetermined time period arrives or after the predetermined time period.

Optionally, after receiving the acknowledgment request message of the dynamic CoMP cooperating set transmitted by the station, the access point forwards the request message or partial contents thereof to a network controller, and the network controller judges whether multiple access points contained in the candidate dynamic CoMP cooperating set can support CoMP transmission of the station, establishes and feeds back the acknowledgment information of the dynamic CoMP cooperating set to the station.

Preferably, the network controller transmits the acknowledgment information of the dynamic CoMP cooperating set to the above-mentioned AP, and the above-mentioned AP forwards the acknowledgment information of the dynamic CoMP cooperating set or repackages the acknowledgment information of the dynamic CoMP cooperating set into a new radio frame and transmits the radio frame to the station.

Preferably, the network controller interacts with, or is unnecessary to interact with the access points contained in the candidate dynamic CoMP cooperating set via a network, to determine whether the access point can support a competency requirement or performance requirement carried in the above-mentioned request message, establishes the dynamic CoMP cooperating set via the network, and triggers the AP contained in the dynamic CoMP cooperating set to complete parameter configuration and initialization before CoMP transmission.

According to another aspect of the preferred embodiment, the station receives identification information of the static CoMP cooperating transmitted by the access point in the form of multicast or unicast, and records the static CoMP cooperating set to which the access point belongs.

Preferably, the station transmits a scanning request message to the access point, requesting the access point to feed back whether to support the CoMP function and the identification information of the static CoMP cooperating set to which the access point belongs, and receives feedback from the access point to acquire the above information; or, the station intercepts a broadcast frame on a certain channel to acquire whether the access point supports the CoMP function and the identification information of the static CoMP cooperating set to which the access point belongs.

Preferably, the station transmits a scanning request message to the access point, requesting the access point to feed back information of member access points in the static CoMP cooperating set to which the access point belongs, and receives feedback from the access point to acquire the above information; or, the station intercepts a broadcast frame on a certain channel to acquire the information of the member access points in the static CoMP cooperating set to which the access point belongs.

Preferably, the station transmits a scanning request message to the access point, requesting the access point to feed back information of one or more corresponding static CoMP cooperating sets containing designated identification information, and information of one or more member access points.

Optionally, the station acquires scanning feedback information or multiple scanning feedback results, and meanwhile, respectively combines two or more access points into one candidate dynamic cooperating set with reference to an access point transmitting power parameter, load information, access control information and other system parameters acquired as well as received signal strength information and signal quality information measured.

Optionally, the station transmits the acknowledgment request message of the dynamic CoMP cooperating set to the access point, carrying the information of one or more of the above candidate dynamic cooperating sets, including multiple access point labels and grouping information, requesting the access point to determine whether two or more access points of one or more optional dynamic coordinating set can form one dynamic CoMP cooperating set to support the actual CoMP transmission from the station to the network.

Preferably, the above-mentioned acknowledgment request message also contains an expected effective period of the dynamic CoMP cooperating set, an effective time of the dynamic CoMP cooperating set, and QoS parameters needing to be supported by the dynamic CoMP cooperating set (including a time delay, a bandwidth, a highest rate, an average throughput, a maximum/minimum throughput, etc.).

Optionally, the station receives the acknowledgment request message of the dynamic CoMP cooperating set from the access point, determines whether subsequent CoMP transmission can be performed and which dynamic CoMP cooperating set is used to perform CoMP transmission according to the parameters carried in the message.

Preferably, the station receives a receiving response frame from the access point and parses that the response frame indicates that the AP is delayed for a period of time before feeding back the acknowledgment request message of the dynamic CoMP cooperating set. After the delay is over or after the delay, the station receives the acknowledgment message of the dynamic CoMP cooperating set from the access point, determines whether subsequent CoMP transmission can be performed and which dynamic CoMP cooperating set is used to perform CoMP transmission according to the parameters carried in the message.

Figure 6:
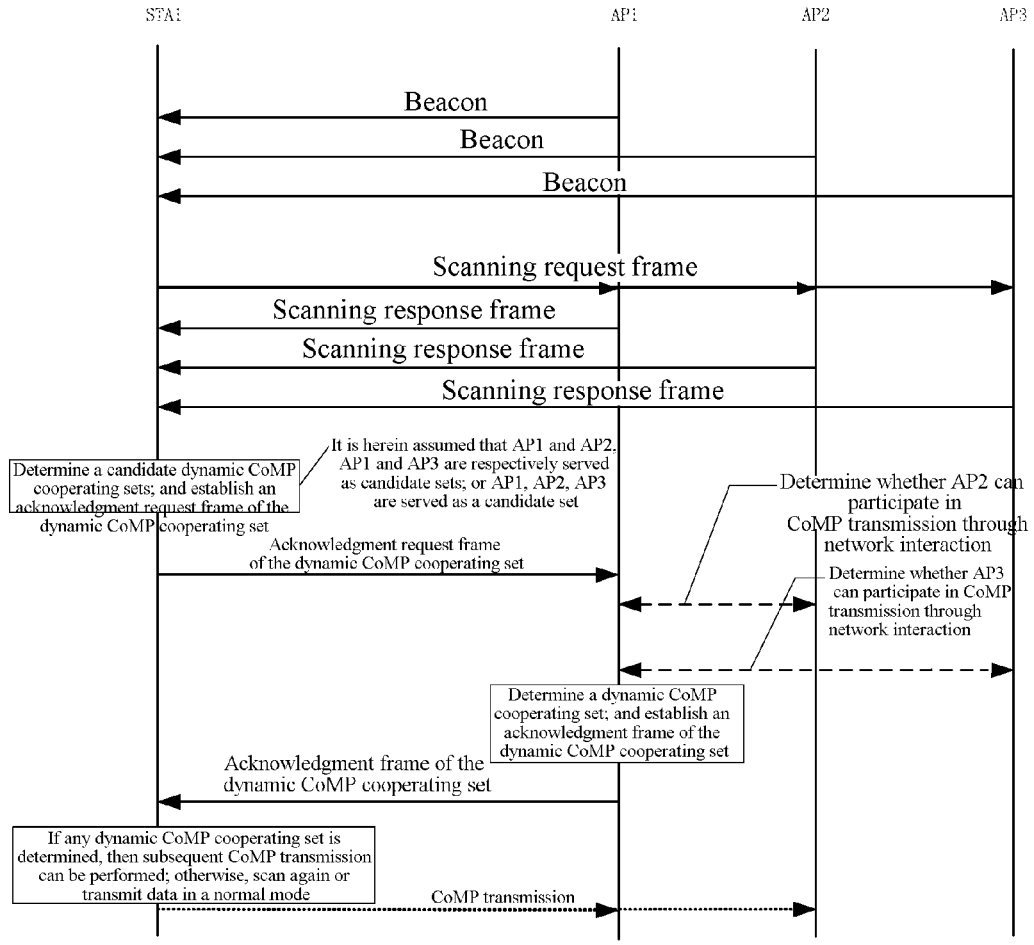
FIG. 6 is a flow chart of a general process according to a preferred embodiment of the present disclosure.

The following will be described in more detail with reference to a specific scene. FIG. 6 is a flow chart of a general process according to a preferred embodiment of the present disclosure. The flows of the following first to fourth preferred embodiments are as shown in FIG. 6.

First Preferred Embodiment

In the present embodiment, there is provided a scanning-based grouping management method in coordinated transmission. In the present embodiment, three access points AP1, AP2 and AP3 are included, and one station STA1 is included. AP1, AP2 and AP3 are connected through a certain network, and mutually support to receive CoMP transmission.

Figure 7:
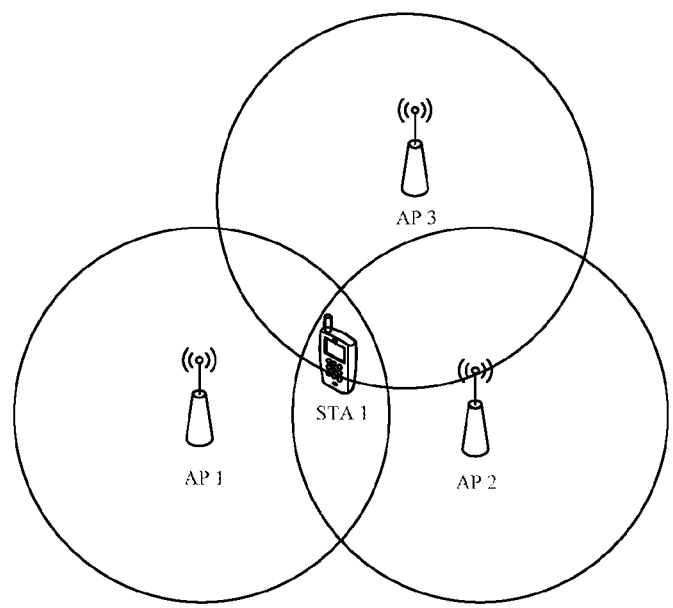
FIG. 7 is a schematic diagram illustrating systems according to first to third preferred embodiments of the present disclosure.

FIG. 7 is a schematic diagram illustrating a system according to first to third preferred embodiments of the present disclosure. With reference to the system as shown in FIG. 7, the first preferred embodiment includes the following steps.

AP1, AP2 and AP3 broadcast a Beacon frame independently and periodically.

The Beacon frame carries indication information indicating to enable a CoMP transmission function, and carries BSSID information (i.e. a MAC address of an AP) and identification information of a static CoMP cooperating set to which the AP belongs. In the present embodiment, the identification information of the static CoMP cooperating set is an ESSID, and AP1, AP2 and AP3 belong to the same ESS and carry the same ESSID information.

STA1 intercepts on a working channel, and receives the Beacon frame broadcast by AP1, AP2 and AP3.

STA1 parses the Beacon frame, finds that AP1, AP2 and AP3 belong to the same static CoMP cooperating set and all enable the CoMP transmission function, and selects AP1, AP2 and AP3 to form a candidate dynamic CoMP cooperating set.

STA1 transmits an acknowledgment request message of the dynamic CoMP cooperating set to AP1, which carries information of the candidate dynamic CoMP cooperating set formed by AP1, AP2 and AP3, including a BSSID (i.e., MAC addresses of AP1, AP2 and AP3), an ESSID, an expected latest effective time of the dynamic CoMP cooperating set, an effective time period, and supported QoS parameters (including a time delay, a bandwidth, a maximum rate, an average throughput, a maximum/minimum throughput, etc.).

After receiving the acknowledgment request message of the dynamic CoMP cooperating set from STA1, AP1 judges that the CoMP transmission of AP1 and AP2 can support the QoS parameters, the latest effective time and the effective time period carried in the above request message, and AP3 cannot support the above CoMP transmission for any reason, and then forms and feeds back acknowledgment information of the dynamic CoMP cooperating set formed by AP1 and AP2.

The above acknowledgment information includes an indication of successful establishment of the dynamic CoMP cooperating set, information of the access points (MAC addresses of AP1 and AP2) forming the dynamic CoMP cooperating set, identification information of the dynamic CoMP cooperating set (independently defined code field for uniquely identifying and distinguishing the dynamic CoMP cooperating set), a MCS range, coding mode, number of streams, number of antennas and other configuration information of CoMP transmission supported by the dynamic CoMP cooperating set, the effective period of the dynamic CoMP cooperating set, and the effective time of the dynamic CoMP cooperating set, etc.

After receiving the acknowledgment information of the dynamic CoMP cooperating set transmitted by AP1, STA1 performs CoMP transmission according to the configuration information of CoMP transmission indicated in the acknowledgment information within the effective period indicated by the acknowledgment information and after the effective time.

Second Preferred Embodiment

In the present embodiment, there is provided a scanning-based grouping management method in coordinated transmission. The present embodiment includes three access points AP1, AP2 and AP3, and one station STA1. AP1 and AP2 are connected through a certain network, and mutually support to receive CoMP transmission. AP2 and AP3 are connected through a certain network, and mutually support to receive CoMP transmission.

With reference to the system as shown in FIG. 7, the second preferred embodiment includes the following steps.

AP1, AP2 and AP3 broadcast a Beacon frame independently and periodically.

The Beacon frame carries information indicating to enable a CoMP transmission function, and carries BSSID information (i.e., a MAC address of an AP) and identification information of a static CoMP cooperating set to which the AP belongs. In the present embodiment, the identification information of the static CoMP cooperating set is an independent character string, and AP1 and AP2 belong to the same static CoMP cooperating set and carry the same identification information of the static CoMP cooperating set. AP2 and AP3 belong to the same static CoMP cooperating set and carry the same identification information of the static CoMP cooperating set. AP2 belongs to two static CoMP cooperating sets; therefore, identification information of two static CoMP cooperating sets is carried in the Beacon frame.

STA1 intercepts on a working channel, and receives the Beacon frames broadcast by AP1, AP2 and AP3.

STA1 parses the Beacon frames, finds that AP1 and AP2 belong to the same static CoMP cooperating set and both enable the CoMP transmission function, and it can be calculated and judged that AP1 and AP2 can support CoMP transmission through a transmitting power parameter carried in the Beacon frame and a receiving signal strength measured; AP2 and AP3 belong to the same static CoMP cooperating set and both enable the CoMP transmission function, and it can be calculated and judged that AP2 and AP3 can support CoMP transmission through the transmitting power parameter carried in the Beacon frame and the received signal strength measured.

Therefore, STA1 selects AP1 and AP2, and AP2 and AP3 to form a candidate dynamic CoMP cooperating set respectively.

STA1 transmits an acknowledgment request message of the dynamic CoMP cooperating set to AP2, which carries:

BSSIDs (i.e., MAC addresses of AP1 and AP2), and ESSIDs of AP1 and AP2;

BSSIDs (i.e., MAC addresses of AP1 and AP2), and ESSIDs of AP2 and AP3; and expected latest effective time and effective time period of the dynamic CoMP cooperating set.

After receiving the acknowledgment request message of the candidate dynamic CoMP cooperating set from STA1, AP2 interacts with AP1 and AP3 respectively through a background network, determines that the CoMP transmission of AP1 and AP2 can optimally satisfy the latest effective time and the effective time period carried in the above request message, and establishes a dynamic CoMP cooperating set with AP2 through the background network, and configures CoMP transmission parameters; and meanwhile, establishes and feeds back acknowledgment information of the dynamic CoMP cooperating set to STA1.

The above acknowledgment information includes an indication of successful establishment of the dynamic CoMP cooperating set, information of the access points (MAC addresses of AP1 and AP2) forming the dynamic CoMP cooperating set, identification information of the dynamic CoMP cooperating set (independently defined code field for uniquely identifying and distinguishing the dynamic CoMP cooperating set), a MCS range, a coding mode, number of streams, number of antennas and other configuration information of CoMP cooperating transmission supported by the dynamic CoMP cooperating set, the effective period of the dynamic CoMP cooperating set, and the effective time of the dynamic CoMP cooperating set, etc.

After receiving the acknowledgment information of the dynamic CoMP cooperating set transmitted by AP1, STA1 performs CoMP transmission according to the configuration information of CoMP transmission indicated in the acknowledgment information within the effective period indicated by the acknowledgment information and after the effective time, and carries the identification information of the dynamic CoMP cooperating set mentioned above in data using CoMP transmission.

Third Preferred Embodiment

In the present embodiment, there is provided a scanning-based grouping management method in coordinated transmission. The present embodiment includes three access points AP1, AP2 and AP3, and one station STA1. AP1 and AP2 are connected through a certain network, and mutually support to receive CoMP transmission. AP3 supports a CoMP function, but a support competency thereof is disabled temporarily.

With reference to the system as shown in FIG. 7, the third preferred embodiment includes the following steps.

STA1 broadcasts and transmits a scanning request message on a working channel, and carries an indication in the scanning request message, requesting an access point receiving the scanning request message to feed back a CoMP transmission competency thereof and information of a CoMP transmission set to which the access point belongs.

AP1, AP2 and AP3 respectively receive the above scanning request message from STA1, and respectively establish and transmit a scanning response frame to STA1, the scanning response frame carrying information that indicates a CoMP transmission competency thereof and information of the CoMP transmission set to which the access point belongs.

AP1 and AP2 carry indication information indicating to enable a CoMP transmission function, and carry BSSID information (i.e. a MAC address of an AP) and identification information of a static CoMP cooperating set to which the AP belongs. In the present embodiment, the identification information of the static CoMP cooperating set is an ESSID, and AP1 and AP2 belong to the same ESS and carry the same ESSID information. AP3 carries indication information indicating to disable the CoMP transmission function.

STA1 receives the scanning response frames transmitted by AP1, AP2 and AP3 respectively. By parsing the above-mentioned scanning response frames respectively, it is found that AP1 and AP2 belong to the same static CoMP cooperating set and both enable a CoMP transmission function; and a CoMP transmission function of AP3 is disabled. Therefore, AP1 and AP2 are selected to form a dynamic CoMP cooperating set.

STA1 transmits an acknowledgment request message of the dynamic CoMP cooperating set to AP1, which carries BSSIDs (i.e., MAC addresses of AP1 and AP2) and ESSIDs of AP1 and AP2, and an expected latest effective time and effective time period of the dynamic CoMP cooperating set.

After receiving the acknowledgment request message of the dynamic CoMP cooperating set from STA1, AP1 interacts with AP2 through a background network, determines that the CoMP transmission of AP1 and AP2 can support the latest effective time and the effective time period carried in the above request message, and establishes a dynamic CoMP cooperating set with AP2 through the background network, and configures CoMP transmission parameters; and meanwhile, establishes and feeds back acknowledgment information of the dynamic CoMP cooperating set to STA1.

The above acknowledgment information includes indication of successful establishment of the dynamic CoMP cooperating set, information of the access points (MAC addresses of AP1 and AP2) forming the dynamic CoMP cooperating set, identification information of the dynamic CoMP cooperating set (independently defined unique code field for identifying and distinguishing the dynamic CoMP cooperating set), a MCS range, coding mode, number of streams, number of antennas and other configuration information of the CoMP cooperating transmission supported by the dynamic CoMP cooperating set, the effective period of the dynamic CoMP cooperating set, and the effective time of the dynamic CoMP cooperating set, etc.

After receiving the acknowledgment information of the dynamic CoMP cooperating set transmitted by AP1, STA1 performs CoMP transmission according to the configuration information of CoMP transmission indicated in the acknowledgment information within the effective period indicated by the acknowledgment information and after the effective time, and carries the identification information of the dynamic CoMP cooperating set mentioned above in data using CoMP transmission.

Fourth Preferred Embodiment

In the present embodiment, there is provided a scanning-based grouping management method in coordinated transmission. The present embodiment includes three access points AP1, AP2 and AP3, and two stations STA1 and STA2. AP1 and AP2 are connected through a certain network, and mutually support to receive CoMP transmission. AP2 and AP3 are connected through a certain network, and mutually support to receive CoMP transmission.

Figure 8:
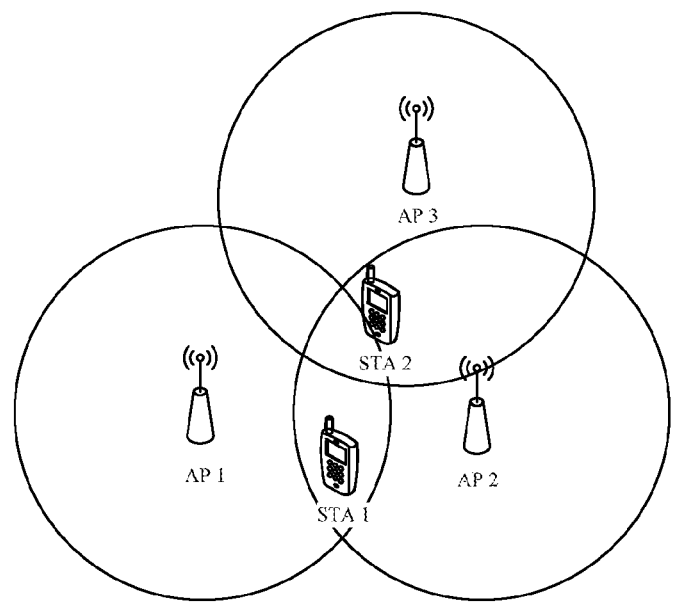
FIG. 8 is a schematic diagram illustrating a system according to a fourth preferred embodiment of the present disclosure.

FIG. 8 is a schematic diagram illustrating a system according to a fourth preferred embodiment of the present disclosure. With reference to the system as shown in FIG. 8, the fourth preferred embodiment includes the following steps.

AP1, AP2 and AP3 broadcast a Beacon frame independently and periodically.

The Beacon frame carries indication information indicating to enable a CoMP transmission function, and carries BSSID information (i.e. a MAC address of an AP) and identification information of a static CoMP cooperating set to which the AP belongs. In the present embodiment, the identification information of the static CoMP cooperating set is an independent character string, and AP1 and AP2 belong to the same static CoMP cooperating set and carry the same identification information of the static CoMP cooperating set. AP2 and AP3 belong to the same static CoMP cooperating set and carry the same identification information of the static CoMP cooperating set. AP2 belongs to two static CoMP cooperating sets; therefore, identification information of two static CoMP cooperating sets is carried in the Beacon frame.

STA1 intercepts on a working channel, and receives the Beacon frames broadcast by AP1 and AP2.

STA2 intercepts on a working channel, and receives the Beacon frames broadcast by AP1, AP2 and AP3.

STA1 parses the Beacon frames, finds that AP1 and AP2 belong to the same static CoMP cooperating set and both enable the CoMP transmission function, and it can be calculated and judged that AP1 and AP2 can support CoMP transmission through a transmitting power parameter carried in the Beacon frame and a received signal strength measured; therefore, STA1 selects AP1 and AP2 to form a candidate dynamic CoMP cooperating set.

STA2 parses the Beacon frame, and finds that AP1, AP2 and AP3 belong to two static CoMP cooperating sets respectively and all enable a CoMP transmission function. Through load parameters and access control parameters carried in the Beacon frame, it can be calculated and judged that AP1 has a poor performance of supporting CoMP transmission; therefore, AP2 and AP3 are preferably selected to form a candidate dynamic CoMP cooperating set.

STA1 transmits an acknowledgment request message of the dynamic CoMP cooperating set to AP2, which carries BSSIDs (i.e., MAC addresses of AP1 and AP2) of AP1 and AP2, identification information of the static CoMP cooperating set to which AP1 and AP2 belongs, and an expected latest effective time and effective time period of the dynamic CoMP cooperating set.

STA2 transmits an acknowledgment request message of the dynamic CoMP cooperating set to AP2, which carries BSSIDs (i.e., MAC addresses of AP2 and AP3) of AP2 and AP3, identification information of the static CoMP cooperating set to which AP2 and AP3 belongs, and an expected latest effective time and effective time period of the dynamic CoMP cooperating set.

After receiving the acknowledgment request message of the dynamic CoMP cooperating set from STA1, AP2 judges that the CoMP transmission of AP1 and AP2 can support the latest effective time and the effective time period carried in the above request message, and hereupon establishes and feeds back acknowledgment information of the dynamic CoMP cooperating set to STA1.

The above acknowledgment information includes indication of successful establishment of the dynamic CoMP cooperating set, information of the access points forming the dynamic CoMP cooperating set, identification information of the dynamic CoMP cooperating set (independently defined unique code field for identifying and distinguishing the dynamic CoMP cooperating set), a MCS range, coding mode, number of streams, number of antennas and other configuration information of CoMP cooperating transmission supported by the dynamic CoMP cooperating set, the effective period of the dynamic CoMP cooperating set, and the effective time of the dynamic CoMP cooperating set, etc.

After receiving the acknowledgment request message of the dynamic CoMP cooperating set from STA2, AP2 judges that the CoMP transmission of AP2 and AP3 cannot support the latest effective time and the effective time period carried in the above request message, and hereupon establishes and feeds back acknowledgment information of the dynamic CoMP cooperating set to STA2.

The above acknowledgment information includes indication of unsuccessful establishment of the dynamic CoMP cooperating set and indication of unsuccessful reasons.

After receiving the acknowledgment information of the dynamic CoMP cooperating set transmitted by AP1, STA1 performs CoMP transmission according to the configuration information of CoMP transmission indicated in the acknowledgment information within the effective period indicated by the acknowledgment information and after the effective time.

After receiving the acknowledgment information of the dynamic CoMP cooperating set transmitted by AP1, STA2 enables a scanning process again, or transmits data in a normal mode.

Fifth Preferred Embodiment

In the present embodiment, there is provided a scanning-based grouping management method in coordinated transmission. The present embodiment includes three access points AP1, AP2 and AP3, one network controller AC1 and one station STA1. AN, AP2 and AP3 are connected with the network controller AC1 through a certain network, and AP1, AP2 and AP3 mutually support to receive CoMP transmission.

Figure 9:
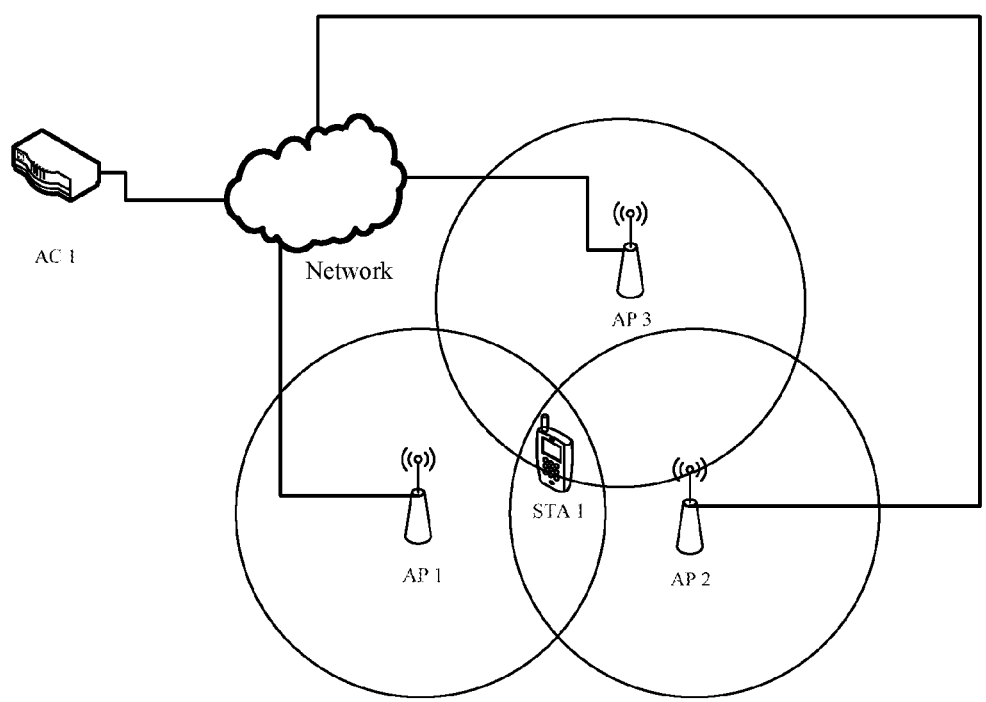
FIG. 9 is a schematic diagram illustrating a system according to a fifth preferred embodiment of the present disclosure.
Figure 10:
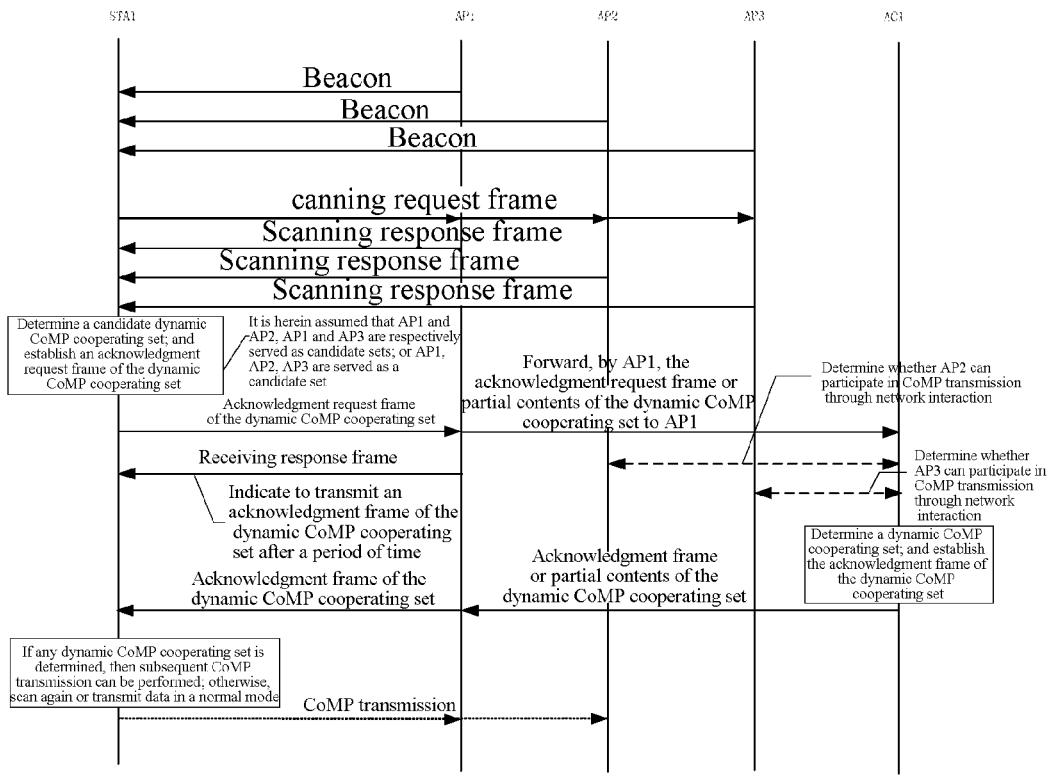
FIG. 10 is a flow chart according to the fifth preferred embodiment of the present disclosure.

FIG. 9 is a schematic diagram illustrating a system according to the fifth preferred embodiment of the present disclosure. FIG. 10 is a flow chart according to the fifth preferred embodiment of the present disclosure. With reference to the system as shown in FIG. 9, the fifth preferred embodiment includes the following steps.

AP1, AP2 and AP3 broadcast a Beacon frame independently and periodically under the control of AC1.

The Beacon frame carries indication information indicating to enable a CoMP transmission function, and carries BSSID information (i.e. a MAC address of an AP) and identification information of a static CoMP cooperating set to which the AP belongs. In the present embodiment, the identification information of the static CoMP cooperating set is an ESSID, and AP1, AP2 and AP3 belong to the same ESS and carry the same ESSID information.

STA1 intercepts on a working channel, and receives the Beacon frames broadcast by AP1, AP2 and AP3.

STA1 parses the Beacon frames, finds that AP1, AP2 and AP3 belong to the same static CoMP cooperating set and all enable the CoMP transmission function, and selects AP1, AP2 and AP3 to form a candidate dynamic CoMP cooperating set.

STA1 transmits an acknowledgment request message of the dynamic CoMP cooperating set to AP1, which carries information of the candidate dynamic CoMP cooperating set formed by AP1, AP2 and AP3, including a BSSID (i.e., MAC addresses of AP1, AP2 and AP3), an ESSID, an expected latest effective time of the dynamic CoMP cooperating set, an effective time period, and supported QoS parameters (including time delay, bandwidth, maximum rate, average throughput, maximum/minimum throughput, etc.).

After receiving the acknowledgment request message of the dynamic CoMP cooperating set from STA1, AP1 forwards a coordinating request message to the network controller AC1, and meanwhile, transmits a receiving response frame ACK to STA1, and carries a delay indication in the ACK, indicating to transmit an acknowledgment response message of the dynamic CoMP cooperating set to STA1 after a period of time.

AP1 judges that the CoMP transmission of AP1 and AP2 can support the QoS parameters, the latest effective time and the effective time period carried in the above request message, and AP3 cannot support the above CoMP transmission for any reason, and then forms and feeds back acknowledgment information of the dynamic CoMP cooperating set formed by AP1 and AP2 to AP1.

The above acknowledgment information includes indication of successful establishment of the dynamic CoMP cooperating set, information of the access points (MAC addresses of AP1 and AP2) forming the dynamic CoMP cooperating set, identification information of the dynamic CoMP cooperating set (independently defined unique code field for identifying and distinguishing the dynamic CoMP cooperating set), a MCS range, coding mode, number of streams, number of antennas and other configuration information of CoMP cooperating transmission supported by the dynamic CoMP cooperating set, the effective period of the dynamic CoMP cooperating set, and the effective time of the dynamic CoMP cooperating set, etc.

AP1 directly transmits the above acknowledgment information of the dynamic CoMP cooperating set from AC1 to STA1, or repackages the above acknowledgment information of the dynamic CoMP cooperating set from AC1 and then transmits it to STA1.

After receiving the acknowledgment information of the dynamic CoMP cooperating set transmitted by AP1, STA1 performs CoMP transmission according to the configuration information of CoMP transmission indicated in the acknowledgment information within the effective period indicated by the acknowledgment information and after the effective time.

Through the description of the above embodiments, those skilled in the art can clearly understand that the method according to the above embodiments can be implemented by means of software plus a necessary general hardware platform, and the method can also be implemented by means of hardware, but in many cases, the former is a better implementation manner. Based on such understanding, the essence of the technical solutions of the embodiments of the present disclosure, or the part contributing to the prior art, may be embodied in the form of a software product which is stored in a storage medium (such as a ROM/RAM, a magnetic disk, an optical disk) including a number of instructions such that a terminal device (which may be a handset, a computer, a server, or a network device, etc.) performs the method described in each of the embodiments of the present disclosure.

Apparatus Embodiments

In the present embodiment, there is also provided a grouping management apparatus in coordinated multiple points (CoMP) located in an access point. The apparatus is configured to implement the foregoing embodiments and preferred implementation manners, but those which have been described will not be described repeatedly. As used below, the term "module" can implement a combination of software and/or hardware with a predetermined function. Although the apparatus described in the following embodiments is preferably implemented by means of software, the implementation of hardware or a combination of software and hardware is also possible and conceived.

Figure 11:
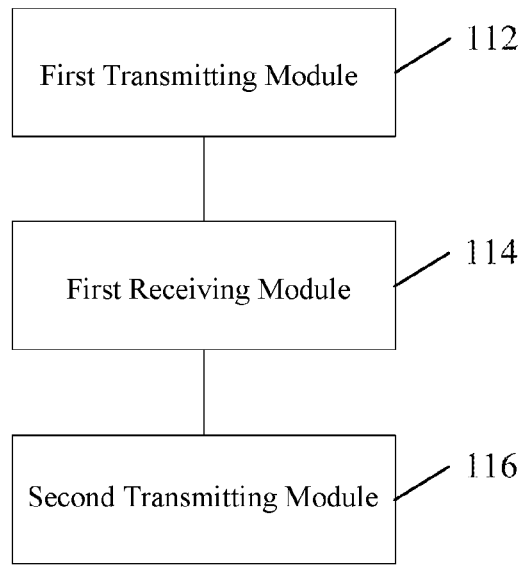
FIG. 11 is a block diagram illustrating a structure of a grouping management apparatus in coordinated multiple points (CoMP) according to an embodiment of the present disclosure.

FIG. 11 is a block diagram illustrating a structure of a grouping management apparatus in coordinated multiple points (CoMP) according to an embodiment of the present disclosure. As shown in FIG. 11, the apparatus includes:

a first transmitting module 112 configured to transmit identification information of the access point to a station, wherein the identification information is used for identifying a static CoMP cooperating set to which the access point belongs;

a first receiving module 114 configured to receive an acknowledgment request message of a dynamic CoMP cooperating set transmitted by the station, wherein the acknowledgment request message of the dynamic CoMP cooperating set contains information of a candidate member(s) belonging to the same dynamic CoMP cooperating set with the access point; and a second transmitting module 116 configured to determine whether to form a dynamic CoMP cooperating set with some or all of the candidate member(s), and feed back acknowledgment information of the dynamic CoMP cooperating set.

Optionally, the identification information includes at least one of the followings: a media access control (MAC) address of one member in the static CoMP cooperating set; a basic service set (BSS) Color of one member in the static CoMP cooperating set; a MAC address of the static CoMP cooperating set; a temporary ESSID character string; and a predefined code field.

Optionally, the first transmitting module is configured to transmit the identification information of the access point to the station in the form of a broadcast frame or a unicast frame, wherein the identification information is carried in one of the following locations: in a physical frame head of the broadcast frame or the unicast frame; in a MAC frame head of the broadcast frame or the unicast frame; and in a data field of the broadcast frame or the unicast frame.

Optionally, the apparatus further includes: a control module configured to transmit information indicating that the access point enables a CoMP function to the station in the form of a broadcast frame or a unicast frame.

Optionally, the apparatus further includes: a power control module configured to transmit a transmitting power parameter of the broadcast frame or the unicast frame to the station in the form of a broadcast frame or a unicast frame, wherein the transmitting power parameter is used for the station to calculate a path loss by measuring a received signal strength.

Optionally, the apparatus further includes: a fourth transmitting module configured to transmit information of member(s) in the static CoMP cooperating set to the station in the form of a broadcast frame or a unicast frame.

Optionally, the apparatus further includes: a feedback module configured to receive a scanning request message transmitted by the station; and feed back information of one or more static CoMP cooperating sets containing the access point according to the scanning request message, or feed back information of one or more corresponding static CoMP cooperating sets containing designated identification information according to the scanning request message; wherein the information of the static CoMP cooperating set contains identification information of the static CoMP cooperating set and information of one or more members in the static CoMP cooperating set.

Optionally, the second transmitting module includes: a first determination unit configured to determine whether to form a dynamic CoMP cooperating set with some or all of the candidate members according to local information; or a second determination unit configured to determine whether to form a dynamic CoMP cooperating set with some or all of the candidate members via a network.

Optionally, the second determination unit is also configured to judge whether the members contained in the acknowledgment request message of the dynamic CoMP cooperating set can support CoMP transmission of the station, and determine whether to form a dynamic CoMP cooperating set with some or all of the candidate members according to a judgment result.

Optionally, the acknowledgment information of the dynamic CoMP cooperating set includes at least one of the followings: identification information indicating successful establishment of the dynamic CoMP cooperating set; identification information indicating unsuccessful establishment of the dynamic CoMP cooperating set; identification information of members in the dynamic CoMP cooperating set, wherein the members in the dynamic CoMP cooperating set are some or all of the candidate members belonging to the same dynamic CoMP cooperating set with the access point; and configuration parameters of the members in the dynamic CoMP cooperating set.

Optionally, the identification information of the dynamic CoMP cooperating set includes at least one of the followings: a MAC address of one member in the dynamic CoMP cooperating set; a BSS Color of one member in the dynamic CoMP cooperating set; a MAC address of the dynamic CoMP cooperating set; a temporary ESSID character string; and a predefined code field.

Optionally, the second transmitting module is also configured to: in the case of determining to form a dynamic CoMP cooperating set with some or all of the candidate members, carry the identification information indicating successful establishment of the dynamic CoMP cooperating set in the feedback acknowledgment information of the dynamic CoMP cooperating set and carry the configuration parameters of the members in the dynamic CoMP cooperating set, wherein the configuration parameters include at least one of an effective period of the dynamic CoMP cooperating set and an effective time of the dynamic CoMP cooperating set; and in the case of determining that a dynamic CoMP cooperating set cannot be formed, carry the identification information indicating unsuccessful establishment of the dynamic CoMP cooperating set in the feedback acknowledgment information of the dynamic CoMP cooperating set.

Optionally, the apparatus further includes: an interacting module configured to interact with the candidate members via a network to determine whether the candidate members can support competency requirements or performance requirements carried in the acknowledgment request message of the dynamic CoMP cooperating set; and if the candidate members can support the competency requirements or performance requirements, establish the dynamic CoMP cooperating set via the network, and trigger the members in the dynamic CoMP cooperating set to complete at least one of parameter configuration and initialization operations before CoMP transmission.

Optionally, the acknowledgment information of the dynamic CoMP cooperating set includes: information of the members forming a dynamic CoMP cooperating set with the access point, wherein the members forming a dynamic CoMP cooperating set with the access point are some or all of the candidate members belonging to the same dynamic CoMP cooperating set with the access point.

Optionally, the second transmitting module is also configured to feed back a receiving acknowledgement frame to the station, the receiving acknowledgement frame indicating that the acknowledgment information of the dynamic CoMP cooperating set will be fed back to the station after a delay of a predetermined time period; and transmit the acknowledgment information of the dynamic CoMP cooperating set to the station when the predetermined time period arrives or after the predetermined time period.

Optionally, the apparatus further includes: a forwarding module configured to forward all or some contents of the acknowledgment request message of the dynamic CoMP cooperating set to a network controller, wherein the network controller is configured to judge whether the members contained in the acknowledgment request message of the dynamic CoMP cooperating set can support CoMP transmission of the station and feed back acknowledgment information of the dynamic CoMP cooperating set to the access point according to a judgment result; and feed back the acknowledgment information of the dynamic CoMP cooperating set to the station.

Optionally, the forwarding module is also configured to receive the acknowledgment information of the dynamic CoMP cooperating set transmitted by the network controller; and forward the acknowledgment information of the dynamic CoMP cooperating set to the station, or repackage the acknowledgment information of the dynamic CoMP cooperating set into a radio frame and then transmit it to the station.

Optionally, the network controller is also configured to judge whether the candidate members can support competency requirements or performance requirements carried in the acknowledgment request message of the dynamic CoMP cooperating set; and if the candidate members can support the competency requirements or performance requirements, establish the dynamic CoMP cooperating set via the network, and trigger the members in the dynamic CoMP cooperating set to complete at least one of parameter configuration and initialization operations before CoMP transmission.

Figure 12:
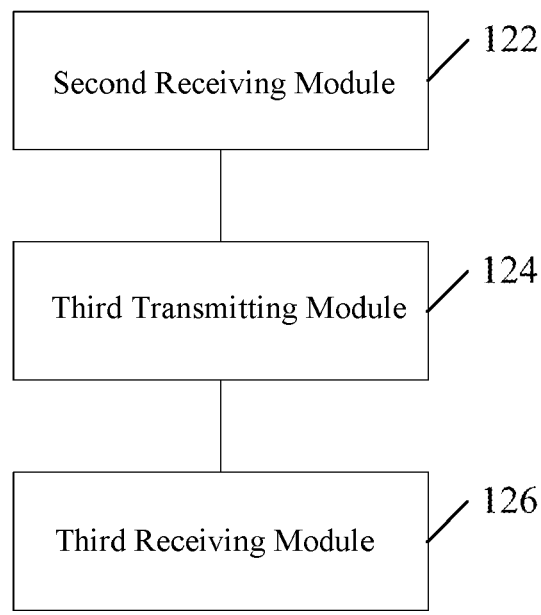
FIG. 12 is a block diagram illustrating a structure of another grouping management apparatus in coordinated multiple points (CoMP) according to an embodiment of the present disclosure.

In the present embodiment, there is also provided another grouping management apparatus in coordinated multiple points (CoMP), which is located in a station. FIG. 12 is a block diagram illustrating a structure of another grouping management apparatus in coordinated multiple points (CoMP) according to an embodiment of the present disclosure. As shown in FIG. 12, the apparatus includes:

a second receiving module 122 configured to receive identification information transmitted by an access point, wherein the identification information is used for identifying a static CoMP cooperating set to which the access point belongs;

a third transmitting module 124 configured to transmit an acknowledgment request message of a dynamic CoMP cooperating set to the access point, wherein the acknowledgment request message of the dynamic CoMP cooperating set contains information of candidate members belonging to the same dynamic CoMP cooperating set with the access point; and a third receiving module 126 configured to receive the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members.

Optionally, the apparatus further includes: a fifth transmitting module configured to transmit a scanning request message to the access point, wherein the scanning request message is used for indicating the access point to feed back information of one or more static CoMP cooperating sets containing the access point, or used for indicating the access point to feed back information of one or more corresponding static CoMP cooperating sets containing designated identification information; wherein the information of the static CoMP cooperating set contains identification information of the static CoMP cooperating set and information of one or more members in the static CoMP cooperating set.

Optionally, the apparatus further includes: an intercepting module configured to intercept a broadcast frame on a predetermined channel to acquire information of one or more static CoMP cooperating sets containing the access point transmitted by the access point or acquire information of one or more corresponding static CoMP cooperating sets containing designated identification information transmitted by the access point; wherein the information of the static CoMP cooperating set contains identification information of the static CoMP cooperating set and information of one or more members in the static CoMP cooperating set.

Optionally, the scanning request message is also used for indicating to feed back whether the access point supports a CoMP function.

Optionally, the apparatus further includes: a combining module configured to acquire feedback information or multiple feedback results of the scanning request message, and respectively combine multiple access points into one or more candidate dynamic cooperating sets with reference to system parameters acquired and signal parameters measured during scanning.

Optionally, the system parameters include at least one of the followings: an access point transmitting power parameter, load information and access control information.

Optionally, the signal parameters include at least one of the followings: received signal strength information and received signal quality information.

Optionally, the acknowledgment request message of the dynamic CoMP cooperating set further includes at least one of the followings: an expected effective period of the dynamic CoMP cooperating set; an effective time of the dynamic CoMP cooperating set; and QoS parameters needing to be supported by the dynamic CoMP cooperating set.

Optionally, the apparatus further includes: a determination module configured to determine a member(s) of the dynamic CoMP cooperating set according to the acknowledgment information of the dynamic CoMP cooperating set, and use the dynamic CoMP cooperating set to perform CoMP transmission.

Optionally, the apparatus further includes: a fourth receiving module configured to receive a receiving acknowledgement frame fed back by the access point, the receiving acknowledgement frame indicating that the acknowledgment information of the dynamic CoMP cooperating set will be fed back to the station after a delay of a predetermined time period; and receive the acknowledgment information of the dynamic CoMP cooperating set transmitted by the access point when the predetermined time period arrives or after the predetermined time period.

It should be noted that the above modules can be implemented by software or hardware. For the latter, it may be implemented by the following manners, but is not limited to this: the above modules are all disposed in the same processor; or, the above modules are respectively located in different processors in any combination form.

Figure 13:
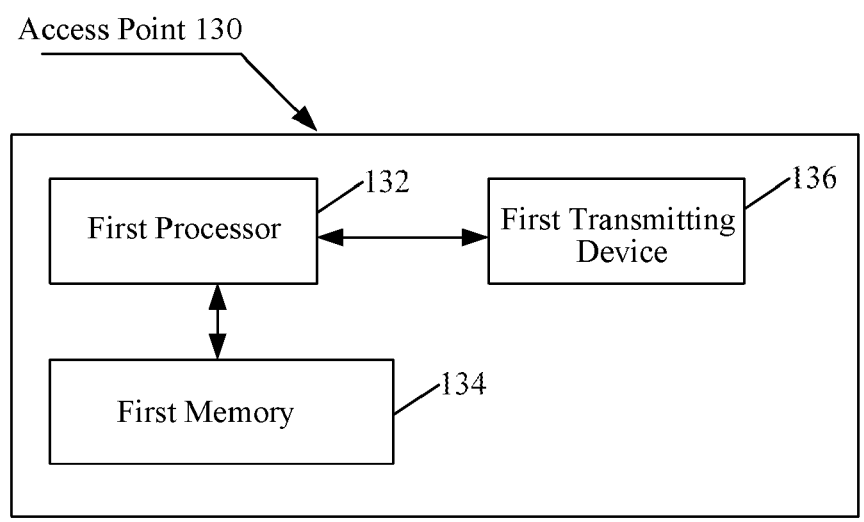
FIG. 13 is a block diagram illustrating a hardware structure of an access point according to an embodiment of the present disclosure.

In the present embodiment, there is also provided an access point. FIG. 13 is a block diagram illustrating a hardware structure of an access point according to an embodiment of the present disclosure. As shown in FIG. 13, the access point 130 may include one or more (only one shown in the figure) first processors 132 (the processors 132 may include, but are not limited to, processing means such as a microprocessor MCU or a programmable logic device FPGA, etc.), a first memory 134 configured to store executable instructions of the first processor, and a first transmitting device 136 for receiving and transmitting information according to the control of the first processor. Those of ordinary skill in the art will understand that the structure as shown in FIG. 13 is only schematic, and does not limit the structure of the electronic device described above. For example, the access point 130 may also include more or fewer components than that shown in FIG. 13, or have different configurations from that shown in FIG. 13.

The first memory 134 may be configured to store software programs and modules of application software, such as program instructions/modules corresponding to the grouping management method in coordinated multiple points (CoMP) in the embodiments of the present disclosure. The first processor 132 executes various functional applications and data processing by running the software programs and modules stored in the first memory 134, i.e., implements the above method. The first memory 134 may include a high-speed random memory and may also include a non-volatile memory such as one or more magnetic storage devices, flash memory, or other non-volatile solid-state memory. In some examples, the first memory 134 may further include a memory remotely disposed with respect to the first processor 132, such remote memory may be connected to the access point 130 through a network. Examples of the above networks include, but are not limited to, the Internet, enterprise intranets, local area networks, mobile communication networks, and combinations thereof.

The first transmitting device 136 is configured to receive or transmit data via a network. The specific example of the network described above may include a wireless network provided by a communication provider of the access point 130. In one example, the first transmitting device 136 includes one Network Interface Controller (NIC) that can be connected to other network devices through a point (base station) so as to be able to communicate with the Internet. In one example, the first transmitting device 136 may be a Radio Frequency (RF) module configured to communicate with the Internet wirelessly.

The first processor 134 is configured to control the first transmitting device 136 to execute following operations:

transmitting identification information of the access point to a station, wherein the identification information is used for identifying a static CoMP cooperating set to which the access point belongs;

receiving an acknowledgment request message of a dynamic CoMP cooperating set transmitted by the station on the basis of the identification information, wherein the acknowledgment request message of the dynamic CoMP cooperating set contains candidate members belonging to the same dynamic CoMP cooperating set with the access point; and determining whether to form a dynamic CoMP cooperating set with some or all of the candidate members, and feeding back acknowledgment information of the dynamic CoMP cooperating set.

Figure 14:
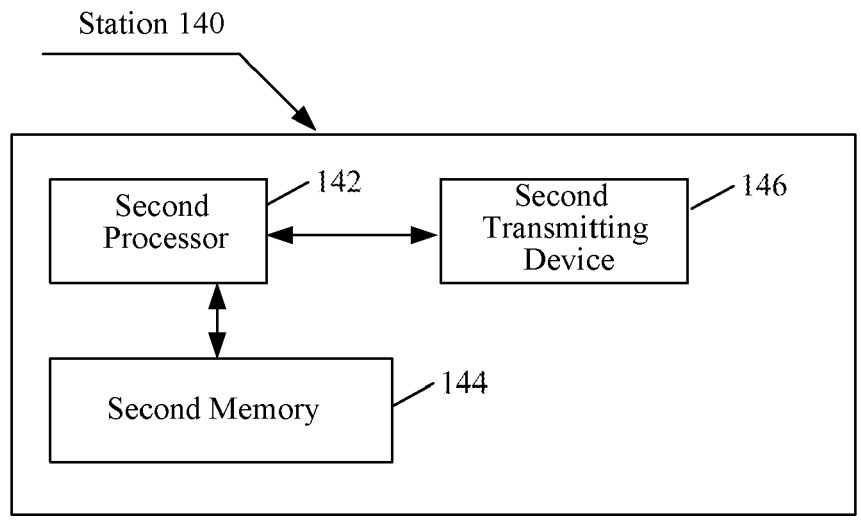
FIG. 14 is a block diagram illustrating a hardware structure of a station according to an embodiment of the present disclosure.

In the present embodiment, there is also provided a station. FIG. 14 is a block diagram illustrating a hardware structure of a station according to an embodiment of the present disclosure. As shown in FIG. 14, the station 140 may include one or more (only one shown in the figure) second processors 142 (the processors 142 may include, but are not limited to, processing means such as a microprocessor MCU or a programmable logic device FPGA, etc.), a second memory 144 configured to store executable instructions of the second processor, and a second transmitting device 146 for receiving and transmitting information according to the control of the second processor. Those of ordinary skill in the art will understand that the structure as shown in FIG. 14 is only schematic, and does not limit the structure of the electronic device described above. For example, the station 140 may also include more or fewer components than that shown in FIG. 14, or have different configurations from that shown in FIG. 14.

The second memory 144 may be configured to store software programs and modules of application software, such as program instructions/modules corresponding to the grouping management method in coordinated multiple points (CoMP) in the embodiments of the present disclosure. The second processor 142 executes various functional applications and data processing by running the software programs and modules stored in the second memory 144, i.e., implements the above method. The second memory 144 may include a high-speed random memory and may also include a non-volatile memory such as one or more magnetic storage devices, flash memory, or other non-volatile solid-state memory. In some examples, the second memory 144 may further include a memory remotely disposed with respect to the second processor 142, and the remote memory may be connected to the station 140 through a network. Examples of the above networks include, but are not limited to, the Internet, enterprise intranets, local area networks, mobile communication networks, and combinations thereof.

The second transmitting device 146 is configured to receive or transmit data via a network. The specific example of the network described above may include a wireless network provided by a communication provider of the station 140. In one example, the second transmitting device 146 includes a Network Interface Controller (NIC) that can be connected to other network devices through a point so as to be able to communicate with the Internet. In one example, the second transmitting device 146 may be a Radio Frequency (RF) module configured to communicate with the Internet wirelessly.

The second processor is also configured to control the second transmitting device to execute following operations:

receiving identification information transmitted by an access point, wherein the identification information is used for identifying a static CoMP cooperating set to which the access point belongs;

transmitting an acknowledgment request message of a dynamic CoMP cooperating set to the access point on the basis of the identification information, wherein the acknowledgment request message of the dynamic CoMP cooperating set contains candidate members belonging to the same dynamic CoMP cooperating set with the access point; and receiving the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members belonging to the same dynamic CoMP cooperating set with the access point.

System Embodiment

Figure 15:
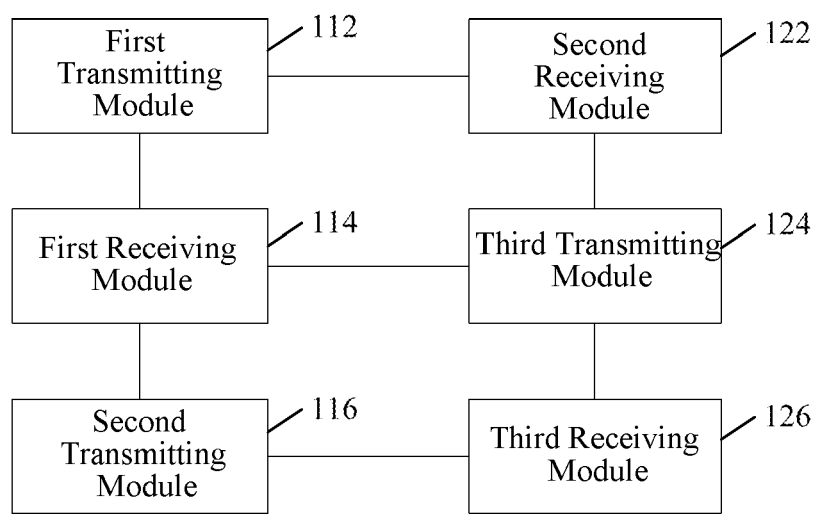
FIG. 15 is a block diagram illustrating a structure of a grouping management system in coordinated multiple points (CoMP) according to an embodiment of the present disclosure.

There is provided a grouping management system in coordinated multiple points (CoMP) in the present embodiment. FIG. 15 is a block diagram illustrating a structure of a grouping management system in coordinated multiple points (CoMP) according to an embodiment of the present disclosure. As shown in FIG. 15, the system includes the grouping management apparatus in coordinated multiple points (CoMP) located in an access point as shown in FIG. 11, and further includes the grouping management apparatus in coordinated multiple points (CoMP) located in a station as shown in FIG. 12.

Figure 16:
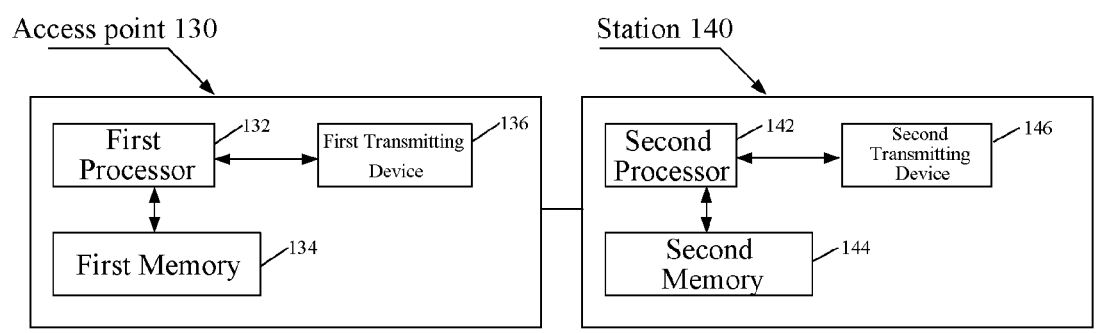
FIG. 16 is a block diagram illustrating a structure of a coordinated multiple points (CoMP) system according to the embodiment of the present disclosure.

There is also provided a coordinated multiple points (CoMP) system in the present embodiment. FIG. 16 is a block diagram illustrating a structure of the grouping management system in coordinated multiple points (CoMP) according to the embodiment of the present disclosure. As shown in FIG. 16, the system includes the access point 130 as shown in FIG. 13 and the station 140 as shown in FIG. 14.

Storage Medium Embodiment

There is also provided a storage medium in the present embodiment. Optionally, the above storage medium in the present embodiment may be configured to store program codes for executing the following steps:

step S402: transmitting, by an access point, identification information of the access point to a station, wherein the identification information is used for identifying a static CoMP cooperating set to which the access point belongs;

step S404: receiving, by the access point, an acknowledgment request message of a dynamic CoMP cooperating set transmitted by the station, wherein the acknowledgment request message of the dynamic CoMP cooperating set includes information of candidate members belonging to the same dynamic CoMP cooperating set with the access point; and step S406: determining, by the access point, whether to form a dynamic CoMP cooperating set with some or all of the candidate members, and feeding back acknowledgment information of the dynamic CoMP cooperating set.

Optionally, the above storage medium is further configured to store program codes for executing the following steps:

step S502: receiving, by a station, identification information transmitted by an access point, wherein the identification information is used for identifying a static CoMP cooperating set to which the access point belongs;

step S504: transmitting, by the station, an acknowledgment request message of a dynamic CoMP cooperating set to the access point, wherein the acknowledgment request message of the dynamic CoMP cooperating set contains information of candidate members belonging to the same dynamic CoMP cooperating set with the access point; and step S506: receiving, by the station, the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members.

Optionally, in the present embodiment, the above-mentioned storage medium may include, but is not limited to: any medium that is capable of storing program codes such as a USB disk, a Read-Only Memory (ROM), a Random Access Memory (RAM), a mobile hard disk, a magnetic disk or an optical disk, and the like.

Optionally, for a specific example in this embodiment, reference may be made to the examples described in the foregoing embodiments and optional embodiments, which will not be elaborated in this embodiment.

It will be apparent to those skilled in the art that the above-described modules or steps of the present disclosure may be implemented by a general purpose computing device which may be focused on a single computing device or distributed over a plurality of computing devices, which may optionally be implemented by a program code executable by the computing device, so that they may be stored in a storage device by the computing device and, in some cases, the steps shown or described may be performed in sequence different from here; or they are separately made into each integrated circuit module, or multiple modules or steps in them are made into a single integrated circuit module. In this way, the present disclosure is not limited to any particular combination of hardware and software.

Those described above are merely preferred embodiments of the present disclosure, but are not intended to limit the present disclosure. To those skilled in the art, the present disclosure may have various changes and modifications. Any change, equivalent substitution, and improvement made within the spirit and principle of the present disclosure shall fall within the protection scope of the present disclosure.

INDUSTRIAL APPLICABILITY

As described above, the grouping management method, apparatus and system in coordinated multiple points (CoMP) provided by the embodiments of the present disclosure have the following advantageous effects: the present disclosure solves the problem in the related art that the CoMP transmission is difficult to be implemented in the WLAN system, can effectively implement the management and fast selection of the CoMP transmission sets as well as dynamic generation of effective grouping, and improve the grouping management efficiency of the CoMP transmission.

What is claimed is:

1. A grouping management method in coordinated multiple points (CoMP), comprising:
   transmitting, by an access point, identification information of the access point to a station, wherein the identification information is used for identifying a static CoMP cooperating set to which the access point belongs;
   receiving, by the access point, an acknowledgment request message of a dynamic CoMP cooperating set transmitted by the station, wherein the acknowledgment request message of the dynamic CoMP cooperating set contains information of candidate members selected by the station from the static CoMP cooperating set and belonging to the same dynamic CoMP cooperating set with the access point; and
   determining, by the access point, whether to form a dynamic CoMP cooperating set with some or all of the candidate members to support cooperating transmission of the station, and feeding back acknowledgment information of the dynamic CoMP cooperating set,
   wherein the identification information comprises at least one of followings:
   a media access control (MAC) address of one member in the static CoMP cooperating set;
   a basic service set (BSS) Color of one member in the static CoMP cooperating set;
   a MAC address of the static CoMP cooperating set;
   an extended service set identifier (ESSID) character string; and
   a predefined code field.

2. The method according to claim 1, wherein the method, before the transmitting, by the access point, the identification information of the access point to the station, further comprises:
   transmitting, by the access point, information indicating that the access point enables a CoMP function to the station in a form of a broadcast frame or a unicast frame,
   wherein the method, before the receiving, by the access point, the acknowledgment request message of the dynamic CoMP cooperating set transmitted by the station, further comprises:
   transmitting, by the access point, information of members in the static CoMP cooperating set to the station in a form of a broadcast frame or a unicast frame.

3. The method according to claim 1, wherein the method, before the transmitting, by the access point, the identification information of the access point to the station, further comprises:
   receiving, by the access point, a scanning request message transmitted by the station;
   feeding back, by the access point, information of one or more static CoMP cooperating sets containing the access point according to the scanning request message; or,
   feeding back, by the access point, information of a corresponding static CoMP cooperating set containing one or more designated identification information according to the scanning request message;
   wherein the information of the static COMP cooperating set contains identification information of the static CoMP cooperating set and information of one or more members in the static CoMP cooperating set.

4. The method according to claim 1, wherein the determining, by the access point, whether to form dynamic CoMP cooperating set with some or all of the candidate members comprises:
   determining, by the access point, whether to form the dynamic CoMP cooperating set with some or all of the candidate members according to local information; or,
   determining, by the access point, whether to form the dynamic CoMP cooperating set with some or all of the candidate members via a network.

5. The method according to claim 1, wherein the acknowledgment information of the dynamic CoMP cooperating set comprises at least one of followings:
   identification information indicating successful establishment of the dynamic CoMP cooperating set;
   identification information indicating unsuccessful establishment of the dynamic CoMP cooperating set;
   identification information of members in the dynamic CoMP cooperating set, wherein the members in the dynamic CoMP cooperating set are some or all of the candidate members belonging to the same dynamic CoMP cooperating set with the access point;
   identification information of the dynamic CoMP cooperating set; and
   configuration parameters of the members in the dynamic CoMP cooperating set.

6. The method according to claim 5, wherein the identification information of the dynamic CoMP cooperating set comprises at least one of followings:
   a MAC address of one member in the dynamic CoMP cooperating set;
   a BSS Color of one member in the dynamic CoMP cooperating set;
   a MAC address of the dynamic CoMP cooperating set;
   a temporary ESSID character string; and
   a predefined code field.

7. The method according to claim 5, wherein the determining, by the access point, whether to form the dynamic CoMP cooperating set with some or all of the candidate members, and feeding back the acknowledgment information of the dynamic CoMP cooperating set comprises:
   in the case that the access point determines to the dynamic CoMP cooperating set with some or all of the candidate members, carrying, by the access point, identification information indicating successful establishment of the dynamic CoMP cooperating set in a feedback acknowledgment information of the dynamic CoMP cooperating set and carrying configuration parameters of the members in the dynamic CoMP cooperating set, wherein the configuration parameters comprise at least one of an effective period of the dynamic CoMP cooperating set and an effective time of the dynamic CoMP cooperating set; and
   in the case that the access point determines that the dynamic CoMP cooperating set cannot be formed, carrying, by the access point, identification information indicating unsuccessful establishment of the dynamic CoMP cooperating set in the feedback acknowledgment information of the dynamic CoMP cooperating set.

8. The method according to claim 1, wherein the method, before the feeding back, by the access point, the acknowledgment information of the dynamic CoMP cooperating set, further comprises:

interacting, by the access point, with the candidate members via a network to determine whether the candidate members can support a competency requirement or a performance requirement carried in the acknowledgment request message of the dynamic CoMP cooperating set; and if the candidate members can support the competency requirement or the performance requirement, establishing, by the access point, the dynamic CoMP cooperating set via the network, and triggering the members in the dynamic CoMP cooperating set to complete at least one of parameter configuration and initialization operation before CoMP transmission.

9. The method according to claim 1, wherein the feeding back, by the access point, the acknowledgment information of the dynamic CoMP cooperating set comprises:

feeding back, by the access point, a receiving acknowledgement frame to the station, the receiving acknowledgement frame indicating that the acknowledgment information of the dynamic CoMP cooperating set will be fed back to the station after a delay of a predetermined time period; and transmitting, by the access point, the acknowledgment information of the dynamic CoMP cooperating set to the station when the predetermined time period arrives or after the predetermined time period.

10. A grouping management method in coordinated multiple points (CoMP), comprising:

receiving, by a station, identification information transmitted by an access point, wherein the identification information is used for identifying a static CoMP cooperating set to which the access point belongs;

transmitting, by the station, an acknowledgment request message of a dynamic CoMP cooperating set to the access point, wherein the acknowledgment request message of the dynamic CoMP cooperating set contains information of candidate members selected by the station from the static CoMP cooperating set and belonging to the same dynamic CoMP cooperating set with the access point; and receiving, by the station, an acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members to support cooperating transmission of the station.

11. The method according to claim 10, wherein the method, before the receiving, by the station, the identification information transmitted by the access point, further comprises:

transmitting, by the station, a scanning request message to the access point, wherein the scanning request message is used for indicating the access point to feed back information of one or more static CoMP cooperating sets containing the access point, or used for indicating the access point to feed back information of a corresponding static CoMP cooperating set containing one or more designated identification information;

wherein the information of the static CoMP cooperating set contains identification information of the static CoMP cooperating set and information of one or more members in the static CoMP cooperating set, wherein the scanning request message is also used for indicating to feed back whether the access point supports a CoMP function.

12. The method according to claim 10, wherein the method, before the receiving, by the station, the identification information transmitted by the access point, further comprises:

intercepting, by the station, a broadcast frame on a predetermined channel to acquire information of one or more static CoMP cooperating sets containing the access point transmitted by the access point or acquire information of a corresponding static CoMP cooperating set containing one or more designated identification information transmitted by the access point;

wherein the information of the static CoMP cooperating set contains identification information of the static CoMP cooperating set and information of one or more members in the static CoMP cooperating set.

13. The method according to claim 11, wherein the method, before the transmitting, by the station, the acknowledgment request message of the dynamic CoMP cooperating set to the access point, further comprises:

acquiring, by the station, feedback information or multiple feedback results of the scanning request message, and respectively combining multiple access points into one or more candidate dynamic cooperating sets with reference to a system parameter acquired and a signal parameter measured during scanning, wherein the system parameter comprises at least one of followings: an access point transmitting power parameter, load information and access control information, wherein the signal parameter comprises at least one of followings: received signal strength information and received signal quality information.

14. The method according to claim 10, wherein the acknowledgment request message of the dynamic CoMP cooperating set further comprises at least one of followings:

an expected effective period of the dynamic CoMP cooperating set;

an effective time of the dynamic CoMP cooperating set; and a quality of service (QoS) parameter needing to be supported by the dynamic CoMP cooperating set.

15. The method according to claim 10, wherein the method, after the receiving, by the station, the acknowledgment information of the dynamic CoMP cooperating set fed back by the access point, further comprises:

determining, by the station, members of the dynamic CoMP cooperating set according to the acknowledgment information of the dynamic CoMP cooperating set, and using the dynamic CoMP cooperating set to perform CoMP transmission.

16. The method according to claim 10, wherein the method, before the receiving, by the station, the acknowledgment information of the dynamic CoMP cooperating set fed back by the access point, further comprises:

receiving, by the station, a receiving acknowledgement frame fed back by the access point, and then feeding back, the receiving acknowledgement frame indicates that the access point will feed back acknowledgment information of the dynamic CoMP cooperating set to the station after a delay of a predetermined time period; and receiving, by the station, the acknowledgment information of the dynamic CoMP cooperating set transmitted by the access point when the predetermined time period is arrived or after the predetermined time period.

17. An access point, comprising:
a first processor;
a first memory configured to store executable instructions of the first processor; and
a first transmitting device for receiving and transmitting information according to a control of the first processor;
wherein the first processor is configured to control the first transmitting device to execute the method according to claim 1.

18. A station, comprising:
a processor;
a memory configured to store executable instructions of the processor; and
a transmitting device for receiving and transmitting information according to a control of the processor;
wherein the processor is configured to control the transmitting device to execute the method according to claim 10.

19. A coordinated multiple points (CoMP) system, comprising an access point and a station,
wherein the access point comprises:
a first processor;
a first memory configured to store executable instructions of the first processor; and
a first transmitting device for receiving and transmitting information according to a control of the first processor;
wherein the first processor is configured to control the first transmitting device to execute following operations:
transmitting identification information of the access point to a station, wherein the identification information is used for identifying a static CoMP cooperating set to which the access point belongs;
receiving an acknowledgment request message of a dynamic CoMP cooperating set transmitted by the station on the basis of the identification information, wherein the acknowledgment request message of the dynamic CoMP cooperating set contains candidate members selected by the station from the static CoMP cooperating set and belonging to the same dynamic CoMP cooperating set with the access point; and
determining whether to form a dynamic CoMP cooperating set with some or all of the candidate members to support cooperating transmission of the station, and feeding back acknowledgment information of the dynamic CoMP cooperating set, and
wherein the station comprises:
a second processor;
a second memory configured to store executable instructions of the second processor; and
a second transmitting device for receiving and transmitting information according to a control of the second processor;
wherein the second processor is configured to control the second transmitting device to execute following operations:
receiving identification information transmitted by an access point, wherein the identification information is used for identifying a static CoMP cooperating set to which the access point belongs;
transmitting an acknowledgment request message of a dynamic CoMP cooperating set to the access point on the basis of the identification information, wherein the acknowledgment request message of the dynamic CoMP cooperating set contains candidate members selected by the station from the static CoMP cooperating set and belonging to the same dynamic CoMP cooperating set with the access point; and
receiving the acknowledgment information of the dynamic CoMP cooperating set fed back by the access point, wherein the acknowledgment information of the dynamic CoMP cooperating set is used for indicating whether the access point forms a dynamic CoMP cooperating set with some or all of the candidate members to support cooperating transmission of the station.

20. A non-transitory storage medium, comprising a stored program, wherein the program executes the method according to claim 1 during running.

* * * * *